United States Patent
Tanaka et al.

(10) Patent No.: US 7,450,156 B2
(45) Date of Patent: Nov. 11, 2008

(54) COMMUNICATION DEVICE, COMMUNICATION SYSTEM, COMMUNICATION METHOD AND COMMUNICATION TERMINAL APPARATUS

(75) Inventors: Hiroshi Tanaka, Asaka (JP); Tomomitsu Muta, Asaka (JP); Mikio Watanabe, Asaka (JP)

(73) Assignee: Fujifilm Corporation, Tokyo (JP)

( * ) Notice: Subject to any disclaimer, the term of this patent is extended or adjusted under 35 U.S.C. 154(b) by 673 days.

(21) Appl. No.: 09/950,573

(22) Filed: Sep. 13, 2001

(65) Prior Publication Data

US 2002/0032911 A1    Mar. 14, 2002

(30) Foreign Application Priority Data

Sep. 13, 2000    (JP)    ............................. 2000-278163
Sep. 27, 2000    (JP)    ............................. 2000-293910

(51) Int. Cl.
*H04N 5/232*    (2006.01)

(52) U.S. Cl. ............. 348/211.3; 348/14.02; 348/207.1; 348/207.11; 455/411; 713/171; 726/18

(58) Field of Classification Search ... 348/211.1–211.4, 348/211.11, 211.99, 14.01, 14.02, 207.1, 348/207.11; 455/411; 713/171; 726/18
See application file for complete search history.

(56) References Cited

U.S. PATENT DOCUMENTS 5,612,732 A * 3/1997 Yuyama et al. .......... 348/14.01

(Continued)

FOREIGN PATENT DOCUMENTS

JP        58157271 A    9/1983

(Continued)

*Primary Examiner*—Lin Ye
*Assistant Examiner*—Chriss S Yoder, III
(74) *Attorney, Agent, or Firm*—Birch, Stewart, Kolasch & Birch, LLP

(57) ABSTRACT

There are provided: a communicating unit (transmitting and receiving unit) that is capable of transmitting and receiving information wirelessly to and from a plurality of electronic cameras and receives identification information peculiar to a device from the electronic cameras; an inputting unit that a user uses to input the identification information peculiar to a device; and a collating unit (information processing unit) for collating the received identification information peculiar to a device with the inputted identification information peculiar to a device. If both pieces of identification information coincide with each other as a result of the collation, the communication device selects a communication device which has transmitted the identification information coinciding with the inputted identification information to transmit information to the communication device thereafter, devices of users wishing to communicate with each other can be easily specified when a plurality of communication devices are connected wirelessly to transmit and receive information. Furthermore, since there are provided an information obtaining unit (wireless interface or the like) for obtaining information owned by a user; a recording unit for recording the information obtained by the information obtaining unit; a first communicating unit (communication line interface) for reading out the information recorded by the recording unit to transmit the information to a destination desired by the user; and a second communicating unit (communication line interface) for transmitting information on a result of the first communicating unit (communication line interface) transmitting the information to a first communication device (portable terminal or the like) on the user side, it becomes possible to notify a user whether or not information that should be transmitted has been surely transmitted.

23 Claims, 18 Drawing Sheets

U.S. PATENT DOCUMENTS

| | | | |
|---|---|---|---|
| 5,666,215 A * | 9/1997 | Fredlund et al. | 358/487 |
| 5,854,654 A * | 12/1998 | Zwahlen et al. | 348/159 |
| 5,862,218 A * | 1/1999 | Steinberg | 713/176 |
| 5,943,603 A * | 8/1999 | Parulski et al. | 725/133 |
| 6,067,624 A * | 5/2000 | Kuno | 713/202 |
| 6,344,875 B1 * | 2/2002 | Hashimoto et al. | 348/207.1 |
| 6,392,686 B1 * | 5/2002 | Kao et al. | 348/14.01 |
| 6,396,537 B1 * | 5/2002 | Squilla et al. | 348/239 |
| 6,513,015 B2 * | 1/2003 | Ogasawara | 705/26 |
| 6,567,122 B1 * | 5/2003 | Anderson et al. | 348/211.3 |
| 6,587,949 B1 * | 7/2003 | Steinberg | 713/193 |
| 6,608,563 B2 * | 8/2003 | Weston et al. | 340/573.1 |
| 6,671,520 B1 * | 12/2003 | Kim | 455/556.1 |
| 6,891,567 B2 * | 5/2005 | Steinberg | 348/211.99 |
| 6,930,709 B1 * | 8/2005 | Creamer et al. | 348/211.3 |
| 6,943,909 B2 * | 9/2005 | Goldstein et al. | 358/1.15 |
| 2005/0264845 A1 * | 12/2005 | Edwards et al. | 358/1.15 |

FOREIGN PATENT DOCUMENTS

| | | |
|---|---|---|
| JP | 3-91356 A | 4/1991 |
| JP | 6-13974 A | 1/1994 |
| JP | 7-38955 A | 2/1995 |
| JP | 07221966 A | 8/1995 |
| JP | 8-33048 A | 2/1996 |
| JP | 8-205237 A | 8/1996 |
| JP | 8-293990 A | 11/1996 |
| JP | 10149309 A | 6/1998 |
| JP | 10191226 A | 7/1998 |
| JP | 2001-175602 A | 6/2001 |

* cited by examiner

F I G. 4
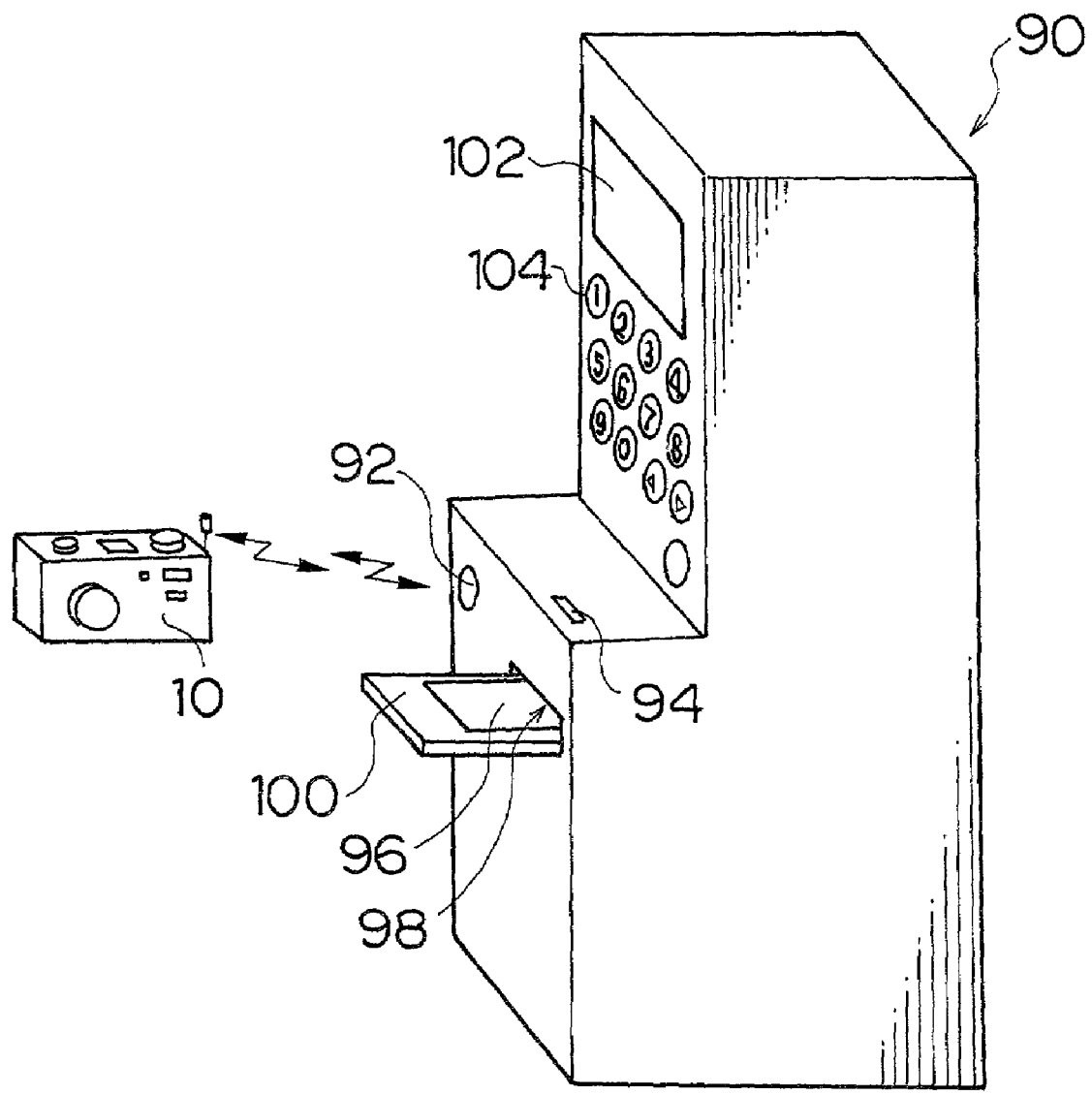

F I G. 1 2
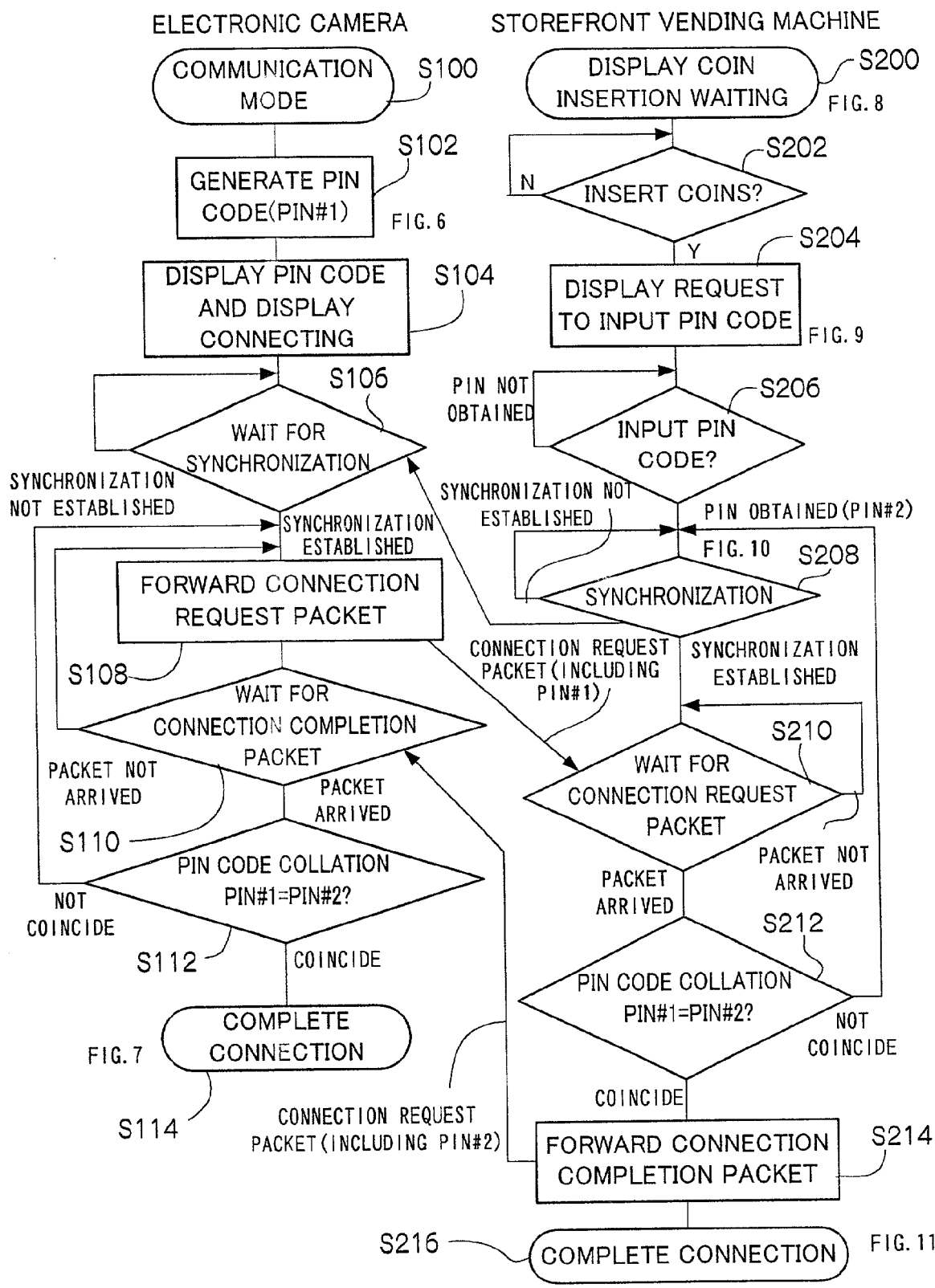

F I G. 1 5
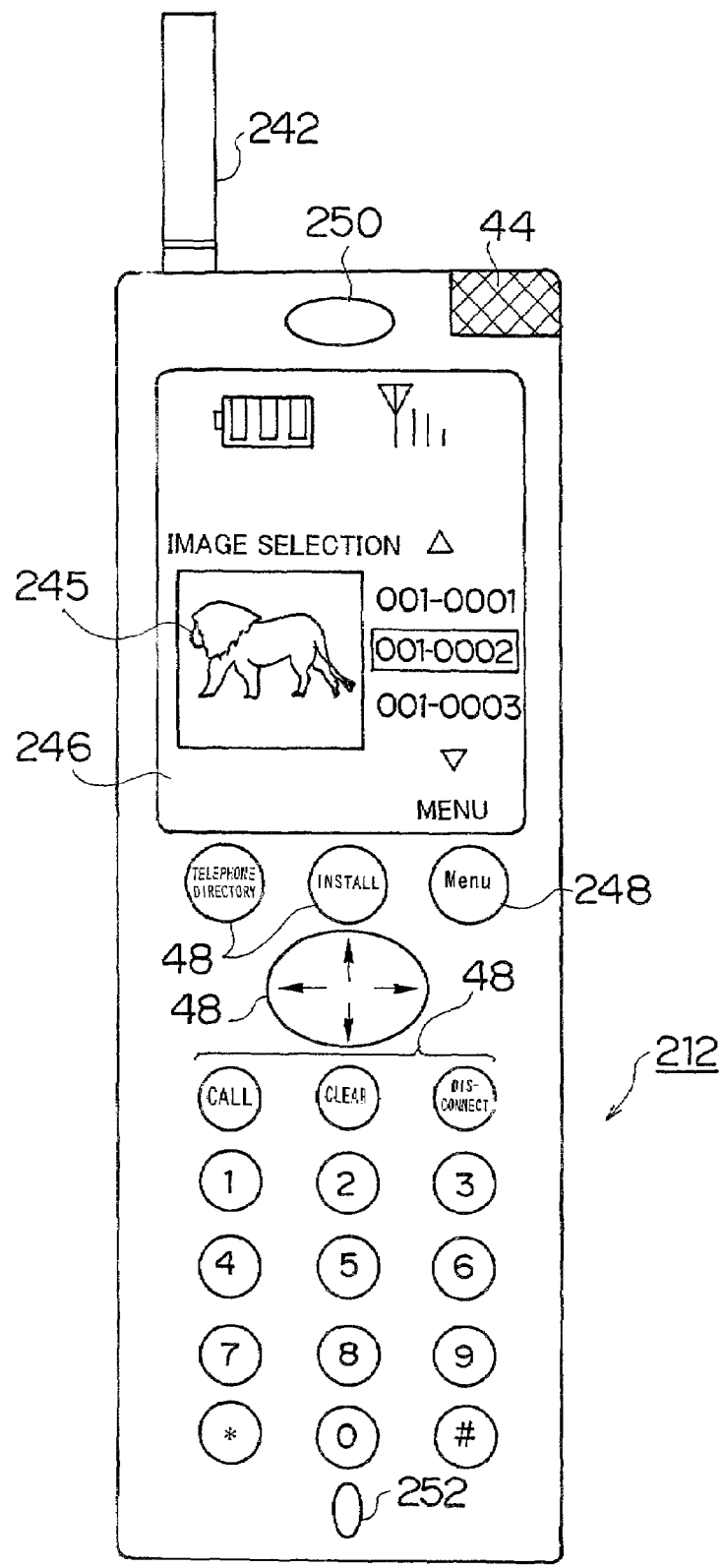

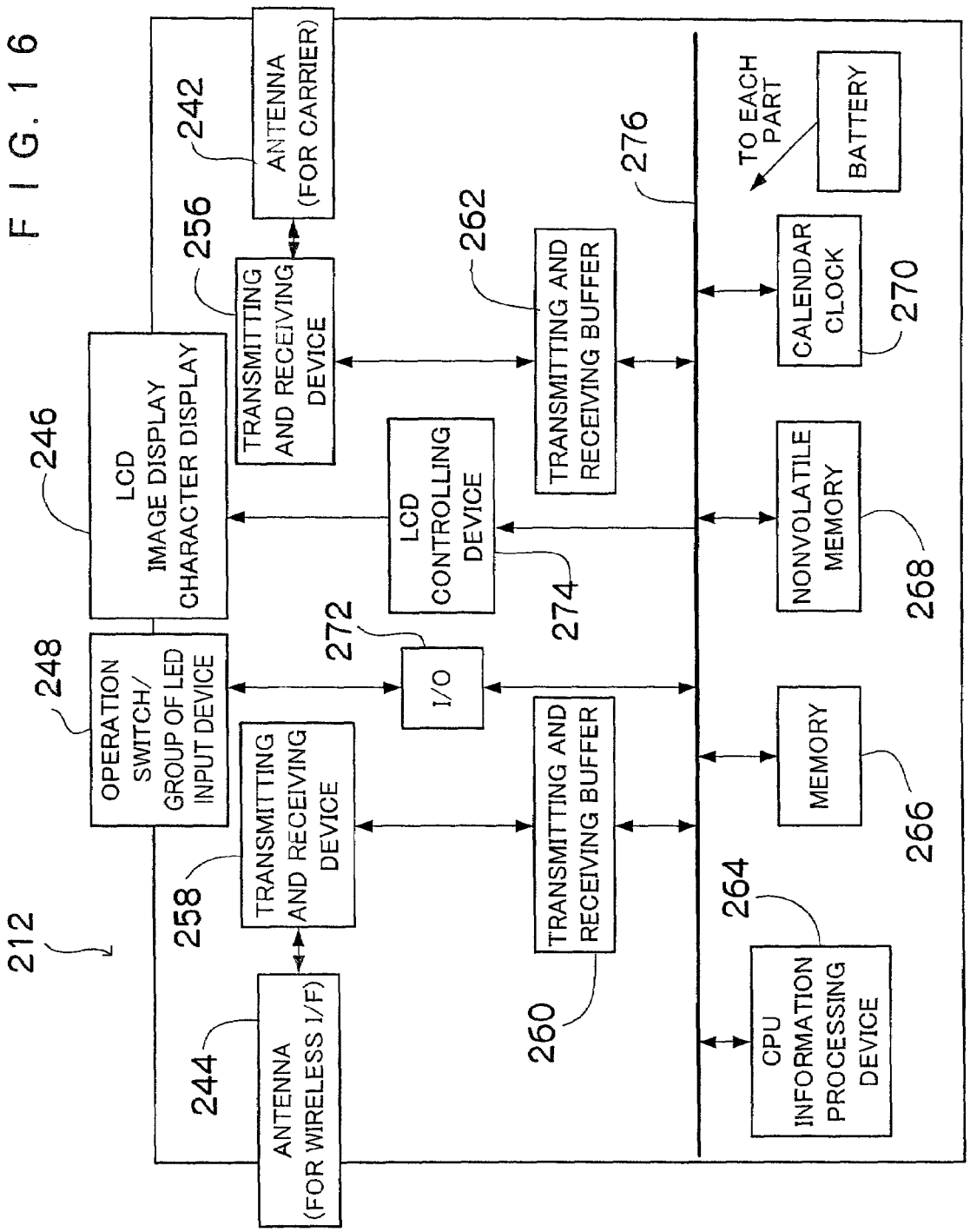

FIG. 19

```
DATA TRANSFER TERMINAL

PLEASE INSERT COINS.

```
DATA TRANSFER TERMINAL

PLEASE INPUT PIN CODE.

```
DATA TRANSFER TERMINAL

CONNECTED···

PIN CODE: 193-513
```

FIG. 22

DATA TRANSFER TERMINAL

PLEASE INPUT TRANSMISSION
DESTINATION OF INFORMATION.

FIG. 23

DATA TRANSFER TERMINAL

PLEASE INPUT TRANSMISSION DATA.

( CANSEL )

FIG. 24

DATA TRANSFER TERMINAL

INPUTTING DATA···

( CANSEL )

FIG. 25

DATA TRANSFER TERMINAL          (CANSEL)

DATA INPUT HAS COMPLETED.
INFORM BY MAIL WHEN
TRANSMISSION HAS COMPLETED.
THANK YOU FOR USING SERVICE.
YOUR USE NUMBER IS XXXX.

COMMUNICATION DEVICE, COMMUNICATION SYSTEM, COMMUNICATION METHOD AND COMMUNICATION TERMINAL APPARATUS

BACKGROUND OF THE INVENTION

1. Field of the Invention

The present invention relates to a communication device, a communication system, a communication method and a communication terminal apparatus and, in particular, to a communication device, a communication system and a communication method of specifying the other party of communication between a plurality of devices connected by wireless communication and a communication terminal apparatus for relaying information in transmitting information among communication devices.

2. Description of the Related Art

Japanese Patent Publication No.6-71327 discloses a recording apparatus, which controls a printer so as to read image information from a detachable memory in which the image information is stored in advance to print image information selected by a setting device. However, since the recording apparatus described in Japanese Patent Publication No. 6-71327 cannot transfer image information without using a detachable memory, a variety of recording media such as a smart medium, a compact flash, a PC card, a multimedia card and a floppy disk are used in recent years. Thus, it is necessary to provide an interface for each recording medium and to insert and pull out the recording medium, which makes the recording media inconvenient for use.

Japanese Patent Application Publication No. 10-191226 discloses an image print system, an image apparatus and a print apparatus, with which, when a digital camera and a printer communicates via a communicating device of infrared ray to print and output an image photographed by the digital camera, a print data conversion software and image data are transmitted from the digital camera by infrared ray, the print data conversion software received by the printer is activated on the printer and the received image data is converted to print data by the print data conversion software. Since these image print system, image apparatus and print apparatus use infrared ray with strong directivity in communication, it is necessary to cause infrared ray emitting and receiving portions of a digital camera and a printer to oppose each other with a predetermined distance between them, which makes them inconvenience for use.

Japanese Patent Application Publication No. 7-221966 discloses an image communication system, which is capable of reducing a communication time and costs by reducing an amount of data flowing on a wireless communication line with higher costs and a slower communication speed compared with a wire communication line if facsimile is transmitted from a wireless communication terminal via a wireless communication network. This image communication system simply performs relay transfer for transmitting data from an inexpensive communication network in order to reduce communication costs of bulk image data.

Japanese Patent Application Publication No. 10-149309 discloses a digital image information accumulation system and a method thereof, which is capable of obtaining a lot of digital image information even with a portable terminal having less memory capacity and easily accessing the image information later to transfer it to the portable terminal. If this digital image information accumulation system and the method thereof are used, there is an advantage that data of a portable terminal is transferred to an installed terminal at a high speed and the transferred data is temporarily stored in the installed terminal and then transmitted to a communication line, whereby a user of the portable terminal is not required to wait in front of the installed terminal until the transmission is completed.

However, there is an inconvenience in that a user cannot easily confirm by any method whether or not the data temporarily stored in the installed terminal has been surely transmitted.

SUMMARY OF THE INVENTION

The present invention has been achieved in view of these circumstances, and it is an object of the present invention to provide a communication device, a communication system and a communication method capable of easily specifying devices of users wishing to communicate each other in connecting a plurality of communication devices by wireless communication to transmit and receive information.

In addition, it is an object of the present invention to provide a communication terminal apparatus that, when transmitting bulk information such as image data inexpensively to another device, is capable of relaying a communication terminal apparatus to transmit information to the another communication device and at the same time notifying a user whether or not data temporarily stored in the communication terminal apparatus has been surely transmitted.

In order to attain the above-mentioned objects, a communication device according to the present invention is provided with a communicating device which is capable of transmitting and receiving information wirelessly to and from a plurality of other communication devices and receives identification information peculiar to a device from the other communication devices; an inputting device which a user uses to input the identification information peculiar to a device; and a collating device which collates the received identification information peculiar to a device with the inputted identification information peculiar to a device, wherein, if both pieces of identification information coincide with each other as a result of the collation, the communication device selects a communication device which has transmitted the identification information coinciding with the inputted identification information to transmit information to the communication device thereafter.

According to the present invention, since the communication device is provided with the communicating device which is capable of transmitting and receiving information wirelessly to and from a plurality of other communication devices and receives identification information peculiar to a device from the other communication devices; the inputting device which a user uses to input the identification information peculiar to a device; and the collating device which collates the received identification information peculiar to a device with the inputted identification information peculiar to a device, and, if both pieces of identification information coincide with each other as a result of the collation, the communication device selects a communication device which has transmitted the identification information coinciding with the inputted identification information to transmit information to the communication device thereafter, devices of users wishing to communicate with each other can be easily specified when a plurality of communication devices are connected wirelessly to transmit and receive information.

In addition, in order to attain the above-mentioned objects, a communication device according to the present invention is provided with a displaying device which generates identification information peculiar to a device to display it to a user;

a communicating device which is capable of transmitting and receiving information wirelessly to and from a plurality of other communication devices and at the same time receives identification information peculiar to a device inputted in another communication device by the user from the another communication device; and a collating device which collates the received identification information peculiar to a device with the generated identification information peculiar to a device, wherein, if both pieces of identification information coincide with each other as a result of the collation, the communication device selects a communication device which has transmitted the identification information coinciding with the inputted identification information to transmit information to the communication device thereafter.

According to the present invention, since the communication device according to the present invention is provided with the displaying device which generates identification information peculiar to a device to display it to a user; the communicating device which is capable of transmitting and receiving information wirelessly to and from a plurality of other communication devices and at the same time receives identification information peculiar to a device inputted in another communication device by the user from the another communication device; and the collating device which collates the received identification information peculiar to a device with the generated identification information peculiar to a device, and, if both pieces of identification information coincide with each other as a result of the collation, the communication device selects a communication device which has transmitted the identification information coinciding with the inputted identification information to transmit information to the communication device thereafter, devices of users wishing to communicate with each other can be easily specified when a plurality of communication devices are connected wirelessly to transmit and receive information.

In addition, in order to attain the above-mentioned objects, a communication device according to the present invention is provided with a first communication device provided with a first communicating device which is capable of transmitting and receiving information wirelessly to and from other communication devices and at the same time generates and transmits identification information peculiar to a device; the first communicating device which is capable of transmitting and receiving information wirelessly to and from another communication apparatus including the first communication device and receives identification information peculiar to a device from other communication devices; an inputting device with which a user inputs identification information peculiar to a device; a collating device which collates the received identification information peculiar to a device with the inputted identification information peculiar to a device; and a second communication device which, if both pieces of identification information coincide with each other as a result of the collation, selects a communication device which has transmitted identification information coinciding with the inputted identification information to perform transmission and reception of information thereafter.

According to the present invention, since the communication device according to the present invention is provided with the first communication device provided with a first communicating device which is capable of transmitting and receiving information wirelessly to and from other communication devices and at the same time generates and transmits identification information peculiar to a device; a second communicating device which is capable of transmitting and receiving information wirelessly to and from another communication apparatus including the first communication device and receives identification information peculiar to a device from other communication devices; the inputting device with which a user inputs identification information peculiar to a device; the collating device which collates the received identification information peculiar to a device with the inputted identification information peculiar to a device; and the second communication device which, if both pieces of identification information coincide with each other as a result of the collation, selects a communication device which has transmitted identification information coinciding with the inputted identification information to perform transmission and reception of information thereafter, devices of users wishing to communicate with each other can be easily specified when a plurality of communication devices are connected wirelessly to transmit and receive information.

In addition, in order to attain the above-mentioned objects, a communicating device according to the present invention is provided with a displaying device which generates identification information peculiar to a device to display it to a user; a first communication device which is capable of transmitting and receiving information wirelessly to and from a plurality of other communication devices and at the same time receives identification information peculiar to a device inputted by the user from another communication device; a collating device which collates the generated identification information peculiar to a device with the identification information peculiar to a device received via the first communicating device; a first communication device which, if both pieces of identification information coincide with each other as a result of the collation, selects a communication device which has transmitted identification information coinciding with the generated identification information to perform transmission and reception of information thereafter; an inputting device which a user uses to input the identification information peculiar to a device; and a second communication device which is capable of transmitting and receiving information wirelessly to and from other communication devices and at the same time transmits identification information peculiar to a device inputted by the user to the first communication device.

According to the present invention, since the communication device according to the present invention is provided with the displaying device which generates identification information peculiar to a device to display it to a user; the first communication device which is capable of transmitting and receiving information wirelessly to and from a plurality of other communication devices and at the same time receives identification information peculiar to a device inputted by the user from another communication device; the collating device which collates the generated identification information peculiar to a device with the identification information peculiar to a device received via the first communicating device; the first communication device which, if both pieces of identification information coincide with each other as a result of the collation, selects a communication device which has transmitted identification information coinciding with the generated identification information to perform transmission and reception of information thereafter; an inputting device which a user uses to input the identification information peculiar to a device; and the second communication device which is capable of transmitting and receiving information wirelessly to and from other communication devices and at the same time transmits identification information peculiar to a device inputted by the user to the first communication device, devices of users wishing to communicate with each other can be easily specified when a plurality of communication devices are connected wirelessly to transmit and receive information.

In addition, in order to attain the above-mentioned objects, a communicating device according to the present invention is provided with an information obtaining device which obtains information owned by a user; a recording device which records the information obtained by the information obtaining device; a first communicating device which reads out the information recorded by the recording device to transmit the information to a destination desired by the user; and a second communicating device which transmits information on a result of the first communicating device transmitting the information to a first communication device on the user side.

According to the present invention, since the communication device according to the present invention is provided with the information obtaining device which obtains information owned by a user; the recording device which records the information obtained by the information obtaining device; a first communicating device which reads out the information recorded by the recording device to transmit the information to a destination desired by the user; and a second communicating device which transmits information on a result of the first communicating device transmitting the information to a first communication device on the user side, it becomes possible to notify a user whether or not information that should be transmitted has been surely transmitted.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 4 is a view showing a situation in which the electronic camera and a storefront vending machine are executing wireless communication;

FIG. 12 is a flow chart of processing of the electronic camera and the storefront vending machine specifying a communication device;

FIG. 15 is an external view of a portable terminal;

FIG. 16 is a block diagram of an information processing unit of the portable terminal;

FIG. 19 is an example showing how a request to insert coins to be displayed on a touch panel of the installed terminal is displayed;

FIG. 20 is an example showing how a PIN code to be displayed on the touch panel of the installed terminal is displayed;

FIG. 21 is an example showing how a connection completion message to be displayed on the touch panel of the installed terminal is displayed;

FIG. 22 is an example showing how a request to input a transmission destination to be displayed on the touch panel of the installed terminal is displayed;

FIG. 23 is an example showing how a request to input transmission information to be displayed on the touch panel of the installed terminal is displayed;

FIG. 24 is an example showing a transmission information receiving message to be displayed on the touch panel of the installed terminal is displayed; and FIG. 25 is an example showing an input completion message to be displayed on the touch panel of the installed terminal is displayed.

DETAILED DESCRIPTION OF THE PREFERRED EMBODIMENTS

Preferred embodiments of the communication device, communication system and communication method according to the present invention will now be hereinafter described with reference to the accompanying drawings.

Figure 1:
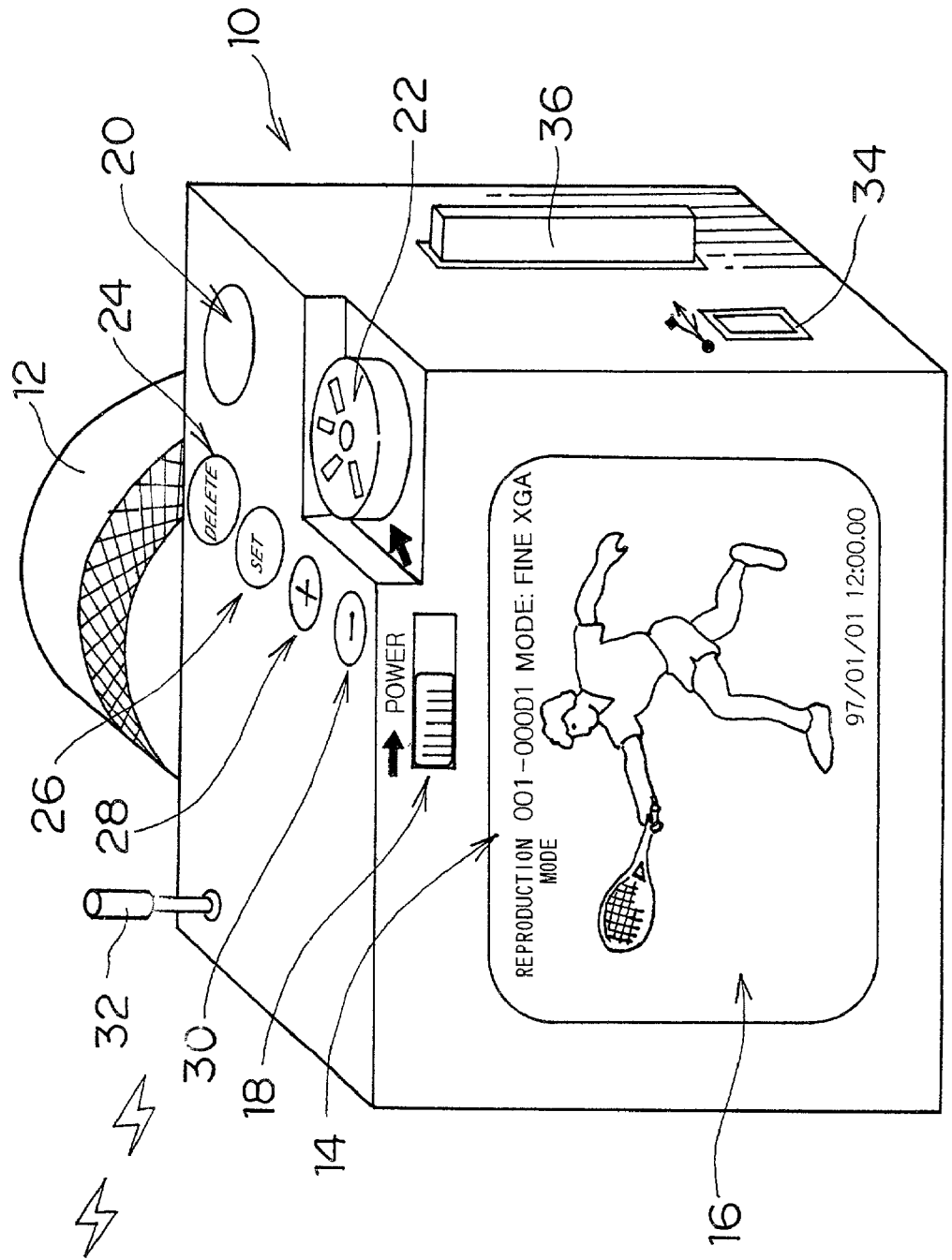
FIG. 1 is an external perspective view of an electronic camera that is an embodiment of a communication device.

FIG. 1 shows an external perspective view of an electronic camera that is a form of a communication device provided with a wireless communication device.

According to the drawing, an electronic camera 10 is provided with a photographing lens 12 for imaging a subject image on an image pick-up device, a displaying device 16 for displaying image data and various kinds of information such as a communication status and a frame number display 14, a power switch 18 for inputting start and stop of functions of the electronic camera 10, a release button 20 with which a user instructs photographing, a mode switching dial 22 for switching to set various modes set in the electronic camera 10, a deletion button 24 for designating a desired item to be deleted from items displayed on the displaying device 16 when it is deleted, a setting button 26 for registering a desired item from the items displayed on the displaying device 16, an increment button 28 to be operated when a frame number or the like displayed on the displaying device 16 is incremented, and a decrement button 30 to be operated when the frame number or the like displayed on the displaying device 16 is decremented.

In addition, also provided in the electronic camera 10 are an antenna 32 for transmitting and receiving carrier waves and data in transmitting and receiving information such as image data and voice data to and from an external device by wireless communication, a communication connector 34 to be used in performing wire communication, and a recording medium inserting portion 38 to be used in exchanging information via a detachable recording medium 36.

Figure 2:
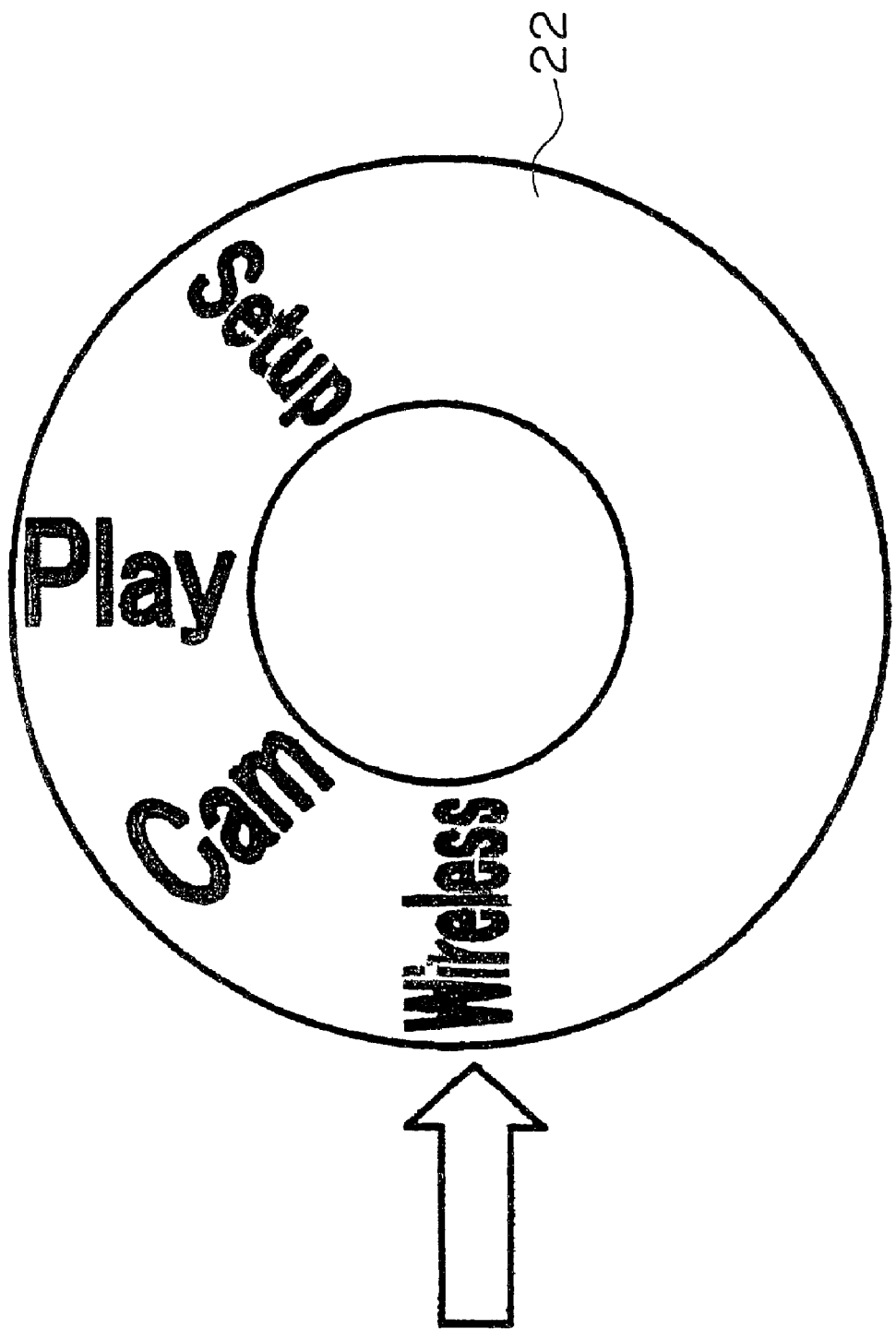
FIG. 2 illustrates various setting mode provided in a mode switching dial.

FIG. 2 illustrates an indication of various setting modes provided in the mode switching dial 22.

According to the drawing, the mode switching dial 22 is provided with communication mode for executing wireless communication with other communication devices (it is shown as Wireless in FIG. 2), a photographing mode for executing photographing (it is shown as Cam in FIG. 2), a reproducing mode for executing reproduction of recorded images (it is shown as Play in FIG. 2), and a set-up mode for setting a date, a photographing mode, a number of photographing images, an automatic power off time of a power source, a volume of warning sound or the like. It is possible to set each mode of the electronic camera 10 by a user switching the mode switching dial 22.

Figure 3:
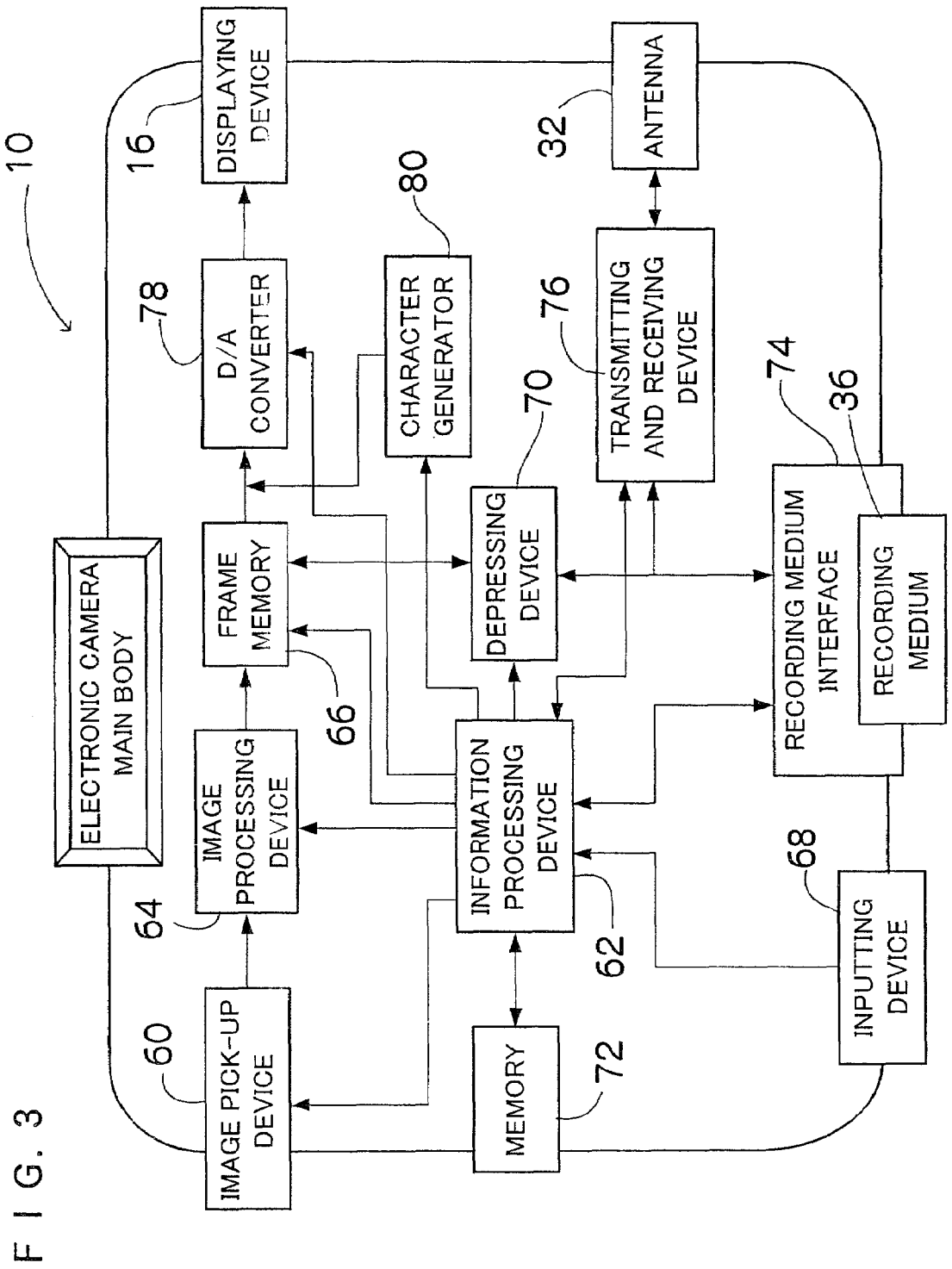
FIG. 3 is a block diagram of the electronic camera.

FIG. 3 is a block diagram of the electronic camera 10.

The electronic camera 10 is provide with an image pick-up device 60 for imaging an image of a subject on a light receiving surface to photoelectrically converting it and outputting the image as image data, an information processing device 62 for performing control of the entire electronic camera 10 and at the same time performing control such as sampling timing control of image data, recording control of image data, figurative recognition of image data, flashing recognition of image data, reading processing of type information or identification information of the electronic camera 10, generation processing of a random number for identification, communication control and display control, an image processing device 64 for performing processing such as change of an image size, sharpness correction, gamma correction, contrast correction and white balance correction, and a frame memory 66 for temporarily storing image data.

In addition, the electronic camera 10 is provided with an inputting device 68 in which a release button, a communication button, a transmission button, a function switch, a crucifix key, a determination switch and a mode switching switch are provided, a depressing device 70 for performing processing for applying compression control to information such as image data by a method represented by JPEG and motion JPEG and applying extension development control to compressed data, and recording medium interface 74 for converting data in order to recording or reading image data in or from a detachable recording medium 36. The recording medium 36 is a detachable recording medium represented by a semiconductor, a magnetic recording medium or an optical recording medium such as a memory card and an MO.

A memory 72 composed of a ROM in which a type name of the electronic camera 10, a peculiar number such as a serial number, an operation program and each constant are recorded and a RAM that is a storing device to be a work area in executing a program are connected to the information processing device 62.

A wireless communication device of the electronic camera 10 to be used when image data or the like is transmitted and received to and from an external apparatus by communication is composed of a transmitting and receiving device 76 (a communicating device) for carrying image data on a carrier wave to transmit or receive the image data by an instruction from the information processing device 62 and an antenna 32 for transmitting and receiving the carrier wave and the data.

In addition, the electronic camera 10 is provided with a D/A converter 78 for displaying information on a connection apparatus and image data on the displaying device 16 and a character generator 80 for converting identification information instructed by the information processing device 62 to data of characters or messages to be displayed.

Photographing processing of the electronic camera 10 configured as above will be described.

An image to be picked up is imaged on a light receiving surface of the image pick-up device 60 and the imaged subject image is photoelectrically converted to be outputted to the image processing device 64. Image data obtained in this way is subject to amplification reduction processing of noises in the image processing device 64 and stored in the temporary frame memory 66. The information processing device 62 sequentially communicates the image data stored in the frame memory 66 to the D/A converter 78 to display it on the displaying device 16.

When the release button provided in the inputting device 68 is pressed, the electronic camera 10 enters a mode for photographing a subject. Then, the information processing device 62 outputs an instruction for transferring the image data stored in the frame memory 66 to the depressing device 70 and executing compression processing of the image data on predetermined conditions. The information processing device 62 then applies processing for sequentially recording the image data on the recording medium 36 with regard to the recording medium interface 74.

In addition, when communication with another connection apparatus is established and the transmission button provided in the inputting device 68 is pressed, the information processing device 62 reads the designated image data from the recording medium 36 one after another and converts the image data to a predetermined data form, and thereafter executes processing for transmitting the image data to an external communication terminal via the transmitting and receiving device 76 and the antenna 32.

FIG. 4 shows a situation in which an electronic camera and a storefront vending machine are executing wireless communication.

As shown in the figure, a storefront vending machine 90 is capable of transmitting and receiving information to and from the electronic camera 10 by wireless communication, and a not-shown user can bring in the electronic camera 10 that is a form of a portable communication device to operate the storefront vending machine 90 and transmit information such as images from the electronic camera 10 to the storefront vending machine 90 to print the information.

Further, the portable communication device is not limited to an electronic camera. The objects of the present invention can be attained by any communication device as long as it is provided with a wireless communicating device such as a personal computer and an audio device.

The storefront vending machine 90 is provided with an antenna 92 capable of wirelessly communicating with a communication device such as the electronic camera 10, a coin insertion opening 94 for inserting a use fee in using the storefront vending machine 90, a print discharge opening 98 for outputting an image or the like to be printed on a print sheet 96, and a tray 100 for guiding the print sheet 96 discharged when the printing is finished.

In addition, the storefront vending machine 90 is provided with a displaying device 102 for displaying a communication status, identification information peculiar to the electronic camera 10 connected by communication, images or the like, and an inputting device 104 composed of input keys with which a user inputs identification information or the like.

Figure 5:
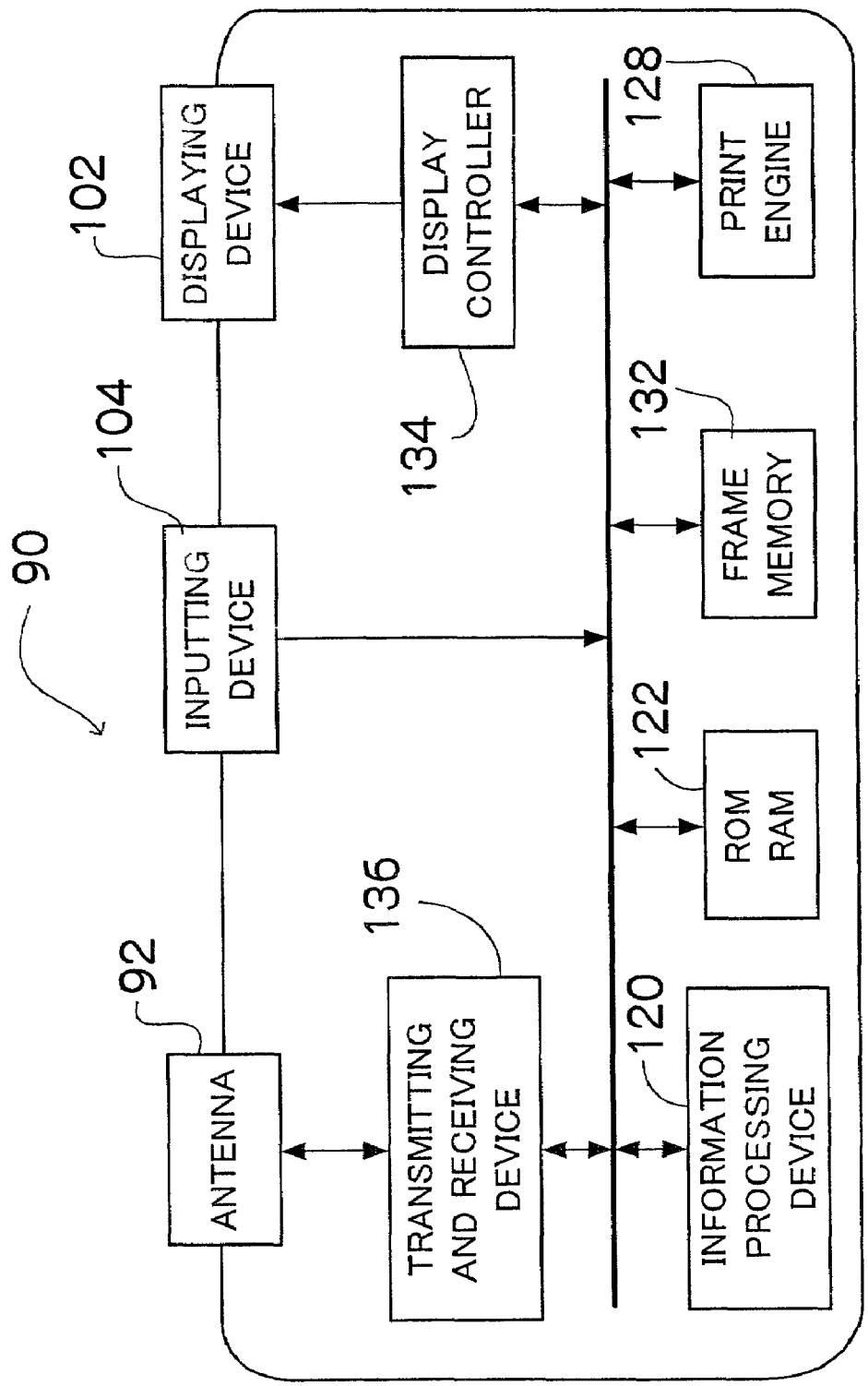
FIG. 5 is a block diagram of a signal processing system of the storefront vending machine.

FIG. 5 shows a block diagram of an information processing system of the storefront vending machine 90.

According to the drawing, the information processing system of the storefront vending machine 90, which is a form of the communication device according to the present invention, is provided with an information processing device 120 for performing control of the entire storefront vending machine 90, a memory 122 composed of a ROM in which a program for operating the information processing device 120, various constants and the like are written and a RAM to be a work area when the information processing device 120 executes processing, a displaying device 102 for displaying information to a user, and an imputing device 104 with which the user inputs an identification code and various kinds of information.

The image signal processing system of the storefront vending machine 90 is provided with a print engine 128 that is a printing device including a machine part for printing an obtained image and character information and a frame memory 132 for temporarily storing information to be displayed on a displaying device such as an external monitor. The frame memory 132 sequentially communicates image data to a display controller 134 at a predetermined frame rate. The display controller 134 converts image data to be displayed to a vide signal suitable for the displaying device 102 to display and transmits the video signal to the displaying device 102, whereby an image and characters are displayed on the displaying device 102.

The communicating device of the storefront vending machine 90, which is used when image data or the like is transmitted and received to and from an external device by communication, is composed of a transmitting and receiving device 136 (a communicating device) for transmitting or receiving image data according to an instruction from the information processing device 120 and the antenna 92 for transmitting and receiving a carrier wave and data.

The information processing device 120 in the storefront vending machine 90 and each peripheral circuit, which includes the memory 122, the display controller 134, the inputting device 104, the print engine 128, the frame memory 132 and the transmitting and receiving device 136, are connected by a bus 124, whereby the information processing device 120 is capable of controlling respective peripheral circuits.

The communicating device which is used when the electronic camera 10 and the storefront vending machine 90 perform wireless communication is a communicating device using an electric wave, a ultrasound wave, an infrared ray or the like as a carrier wave. When an infrared ray is used for the communicating device, operability is improved if a communicating device using a diffused light capable of wide range of communication is utilized.

When a user desires printing of an image that is a kind of contents of services provided by the storefront vending machine 90 and designates the image to be printed to transmit it, the user first operates the inputting device 68 of the electronic camera 10 to set a processing mode at a communication mode. Communication is then automatically established between the electronic camera 10 and the storefront vending machine 90. For example, if a plurality of users carry communication devices of their own, respectively, in the vicinity of the storefront vending machine 90, it is possible that a plurality of communication devices are connected to one storefront vending machine 90 via wireless communication. The wireless communication is provided with a characteristic that a plurality of communication devices can be connected easily. In this case, the storefront vending machine 90 gives rise to a deficiency that the electronic camera 10 of an actual user who pays a fee to operate the storefront vending machine 90 cannot be specified.

According to the present invention, even if a plurality of communication devices exist in an area where wireless communication is possible and the storefront vending machine 90 is connected the plurality of communication devices via wireless communication, it becomes possible to correctly specify communication devices carried by particular users to thereafter execute transmission and reception of information among the specified devices.

In specifying the communication device, a common code (identification information such as numbers and alphabets) is set among communication devices wishing to communicate with each other and communication is only executed among the devices having the set common code. The specification of a communication device is called pairing. The common code is displayed on the displaying device 16 of the electronic camera 10 by, for example, the electronic camera 10 generating a code corresponding to an ID peculiar to a device, and a user reads the code to input it via the inputting device 104 of the storefront vending machine 90.

The code peculiar to a device to be generated by the electronic camera 10 may be, for example, a code such as a manufacturer name, a type or a serial number of the electronic camera 10 or a code that is derived by combining each piece of the information. Alternatively, the code may be a code to be generated as a random number each time. In addition, if a user stores a code peculiar to the electronic camera 10 in advance, the user may input the code in the inputting device 104 of the storefront vending machine 90 without causing the electronic camera 10 to display it. The storefront vending machine 90 specifies the electronic camera 10 having the code inputted by the user to perform transmission and reception of information thereafter, thereby executing the pairing.

When the pairing is completed, a directory (including a pass name or a directory name) in which information such as an image is recorded and image file information are displayed on the displaying device 16 of the electronic camera 10 in characters or a tree. Then, when the user operates the increment button 28 or the decrement button 30 provided in the inputting device 68 to select a desired image file to select contents to be utilized according to necessity, the storefront vending machine 90 transmits the designated image file to a destination device.

Further, the contents provided by the storefront vending machine 90 may be a service for uploading an image or sound to a specific site, a service for downloading an image or sound from a specific site or the storefront vending machine 90, a service for purchasing goods, or the like in addition to a print of an image.

Figure 6:
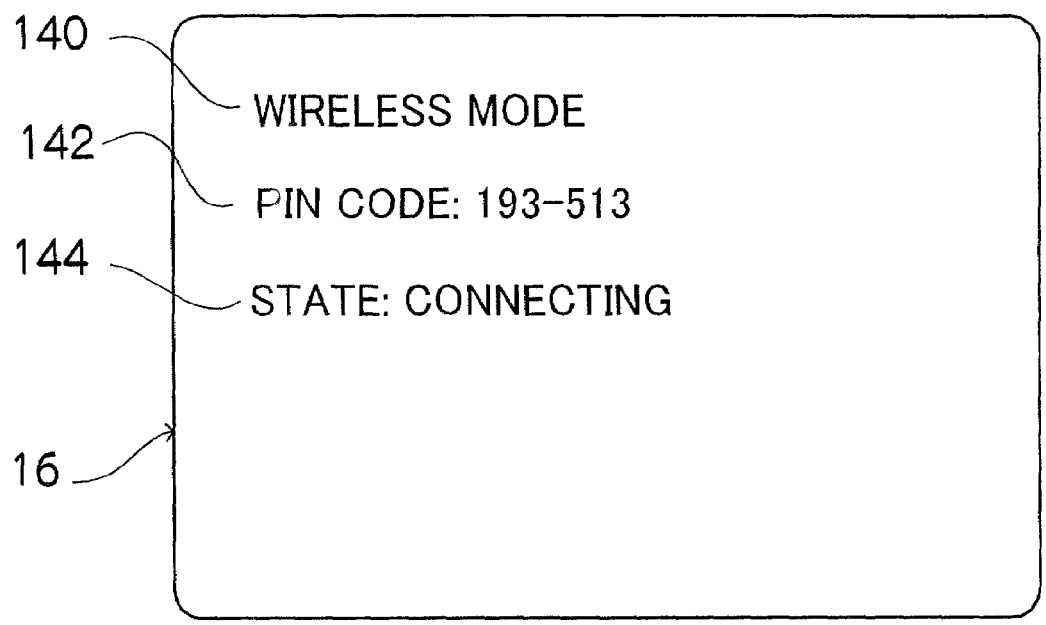
FIG. 6 illustrates an example showing how a code to be displayed on a displaying device of the electronic camera is displayed.

FIG. 6 shows an example showing how a generated code to be displayed on the displaying device 16 of the electronic camera 10 is displayed.

According to the drawing, mode information 140 indicating that the mode set in the electronic camera 10 is a communication mode, code information 142 issued by the electronic camera 10 (PIN code: written as 193-513) and operation information 144 for displaying current processing contents of the electronic camera 10 are displayed on the displaying device 16. Further, the "PIN code" written in a part of the code information 142 indicates a code of a Personal Identification Number.

Figure 7:
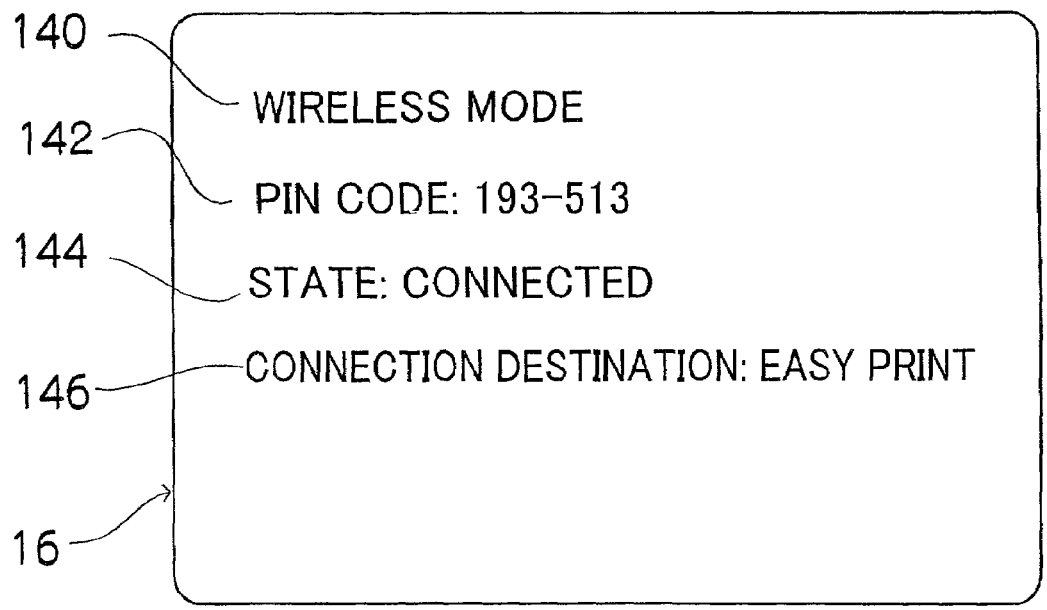
FIG. 7 illustrates an example showing how a destination device of connection to be displayed on the displaying device of the electronic camera is displayed.

When the electronic camera 10 establishes communication with the storefront vending machine 90 in the state shown in FIG. 6, an indication of the displaying device 16 shifts to display shown in the next FIG. 7.

FIG. 7 shows an example showing how a connection destination device to be displayed on the displaying device 16 of the electronic camera 10 is displayed.

According to the drawing, connection destination information 146 "connection destination: easy print" is displayed in addition to the display shown in FIG. 6. The "easy print" shown here is what the contents of the storefront vending machine 90 are called, which indicates a print machine for providing a service for printing and outputting an image based on the image data recorded in the electronic camera 10.

Figure 8:
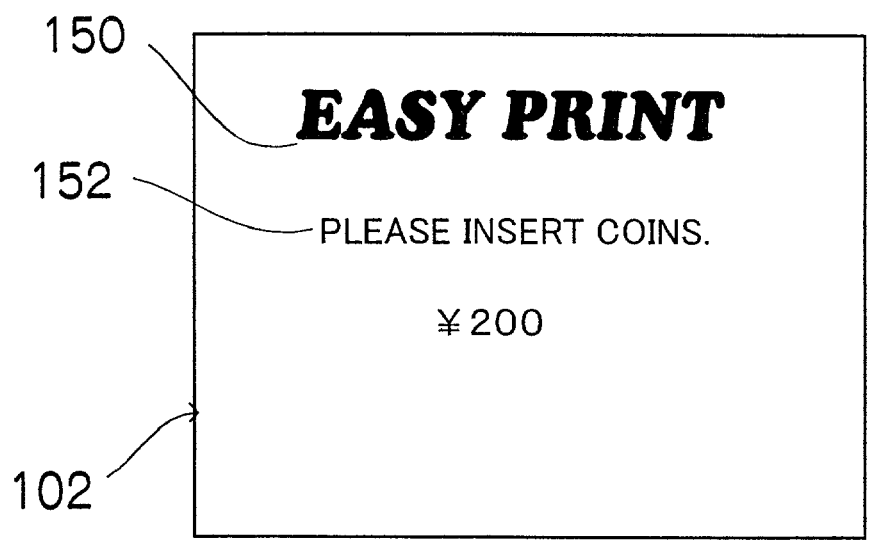
FIG. 8 illustrates information to be displayed on the displaying device of the storefront vending machine first.

FIG. 8 shows information to be displayed in the displaying device 102 of the storefront vending machine 90 first.

According to the drawing, mode information 150 "easy print" indicating that the processing mode set in the storefront vending machine 90 is a print mode and an operation instruction 152 for requesting a user to perform some input are displayed on the displaying device 102.

Figure 9:
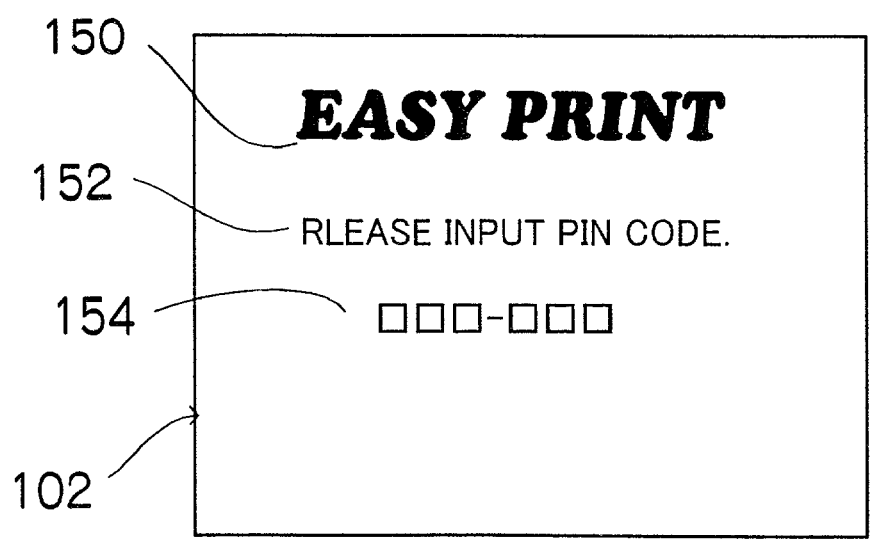
FIG. 9 illustrates information to be displaying on the displaying device of the storefront vending machine upon inputting a PIN code.

FIG. 9 shows information to be displayed upon inputting the PIN code on the displaying device 102 of the storefront vending machine 990.

According to the drawing, an operation instruction 152 for requesting a user to perform some input and an input frame 154 are displayed on the displaying device 102.

Figure 10:
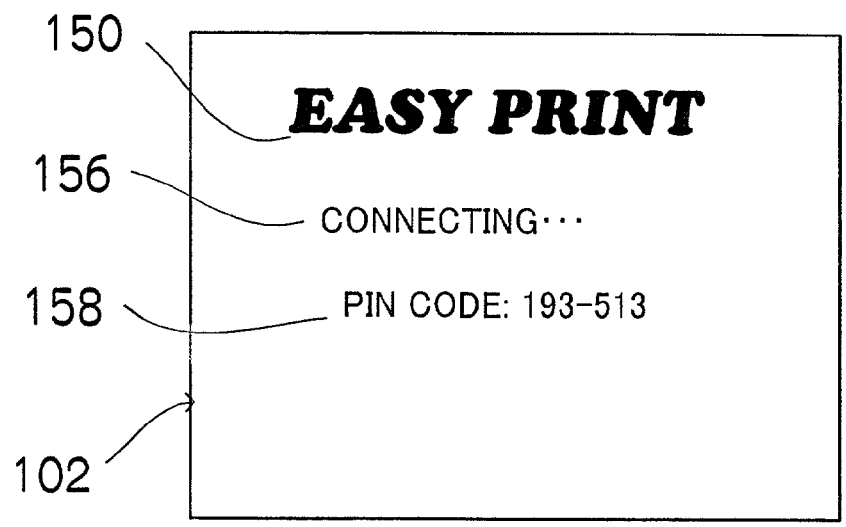
FIG. 10 illustrates information to be displayed on the displaying device of the storefront vending machine during communication connection.

FIG. 10 shows information to be displayed during communication connection on the displaying device 102 of the storefront vending machine 90.

According to the drawing, operation information 156 for notifying the user that the storefront vending machine 90 is in connection processing of wireless communication with the electronic camera 10 and code information 158 for monitor displaying the inputted PIN code to the user are displayed on the displaying device 102.

Figure 11:
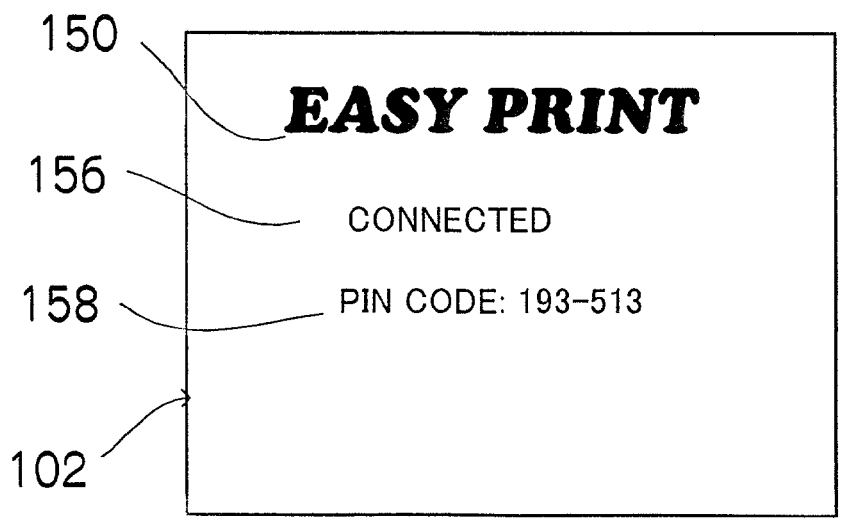
FIG. 11 illustrates information to be displayed on the displaying device of the storefront vending machine after the completion of the communication connection.

FIG. 11 shows information to be displayed after the communication connection is completed in the displaying device 102 of the storefront vending machine 90.

The operation information 156 for notifying the user that the connection processing of wireless communication with the electronic camera 10 and the specification of the electronic camera 10 were completed and the pairing ended and the code information 158 for monitor displaying the inputted PIN code to the user are displayed on the displaying device 102.

FIG. 12 shows a flow chart of processing for the electronic camera 10 and the storefront vending machine 90 to specify a communication device.

When the setting mode of the electronic camera 10 is set in a communication mode, a processing routine of S100 "communication mode" is called in a processing program of the information processing device 62 of the electronic camera 10, and the processing program advances to the next S102 "generate a PIN code (PIN#1)".

In step S102, the electronic camera 10 performs processing for generating a PIN code "PIN#1" composed of identification information or a random number peculiar to a device. In the next S104 "display a PIN code indication and an indication showing connection is being performed", the electronic camera 10 makes the indication shown in FIG. 6 and at the same time starts communication connection with the storefront vending machine 90 and the processing program advances to determination of the next S106 "wait for synchronization". In S106, the electronic camera 10 determines whether or not timing of transmission and reception with another communication device coincides with each other and it has entered a state in which it can communicate, and performs processing for waiting until synchronization is established.

A first state in the storefront vending machine 90 is S200 "display coin insertion waiting", in which the electronic camera 10 displays the indication shown in FIG. 8 on the displaying device 102 and at the same time performs processing for waiting for the user inserting coins in the next S202 "insert coins?". Here, when coins are inserted, the processing program of the electronic camera 10 advances to the next S204 "display a PIN code input request" and at the same time makes the indication shown in FIG. 9 on the displaying device 102. The processing program of the electronic camera 10 then advances to determination of the next S206 "input a PIN code?" and waits for a PIN code to be inputted.

The user operates the inputting device 104 while watching the input frame 154 displayed on the displaying device 102 to input a PIN code to be indicated in the code display of the displaying device 16 of the electronic camera 10. When the input of the PIN code ends, the indication shown in FIG. 10 is made on the displaying device 102. The electronic camera 10 stores the inputted PIN code as "PIN#2" and the processing program advances to determination of the next S208 "synchronization".

In the next S208, the storefront vending machine 90 transmits a request for establishing synchronization of wireless communication to the electronic camera 10 and the processing program advances to determination of the next S210 "wait for connection request packet". When the electronic camera 10 receives the request for establishing synchronization and determines that synchronization of communication is established in S106, the electronic camera 10 transmits a connection request packet (including PIN#1) to the storefront vending machine 90 in S108 "forward a connection request packet". Then, the processing program of the electronic camera 10 advances to the next S110 "wait for a connection completion packet" and performs processing for waiting for a connection completion packet to arrive. If the connection completion packet has not arrived in S110, the electronic camera 10 branches to return to S108.

In addition, when the connection request packet including the PIN code #1 is received in S210, the processing program of the storefront vending machine 90 advances to determination of the next S212 "PIN code collation PIN#1=PIN#2?" in response to the arrival of the packet and determines whether or not the PIN code received from the electronic camera 10 and the PIN code inputted in the storefront vending machine 90 are equal. If the PIN code do not coincide with each other, the storefront vending machine 90 determines that the connected communication device is not the electronic camera 10 of an actual user and the processing program branches to return to S208, where the storefront vending machine 90 performs processing for inspecting PIN codes of other communication devices.

If it is determined that the PIN code inputted in S212 and the PIN code received from the electronic camera 10 coincide with each other, the storefront vending machine 90 determines that the connected communication device is the electronic camera 10 of the actual user and the processing program advances to S214 "forward a connection completion packet" to forward the connection completion packet including the PIN code #2 inputted in the electronic camera 10. Then, the processing program of the storefront vending machine 90 advances to the next S216 "complete connection" and at the same time makes the indication shown in FIG. 11 on the displaying device 102, whereby the connection processing ends and a communication path is secured.

The processing program of the electronic camera 10 having received the connection completion packet advances from S110 to determination of S112 "PIN code collation PIN#1=PIN#2?" and determines whether or not the PIN code that has arrived from the storefront vending machine 90 and the PIN code generated by the electronic camera 10 are equal. If the PIN codes does not coincide with each other, the electronic camera 10 determines that it is not regarded as the actual user by the storefront vending machine 9, and the processing program branches to return to S108, where operation of the storefront vending machine 90 by the current actual user ends and the electronic camera 10 performs processing for waiting for a state in which the storefront vending machine 90 starts connection by a new PIN code again.

If it is determined in S112 that the PIN code generated by the electronic camera 10 and the PIN code received from the storefront vending machine 90 coincide with each other, the electronic camera 10 determines that it is regarded as the actual user by the storefront vending machine 90 and the processing program advances to S114 "complete connection". Then the electronic camera 10 makes the indication shown in FIG. 7 on the displaying device 16 and completes the connection processing.

In the above-mentioned embodiment, it is described that the electronic camera 10 generates identification information peculiar to a device to transmit it to the storefront vending machine 90, a user inputs the identification information in the inputting device 104 of the storefront vending machine 90, the storefront vending machine 90 collates the identification information received from the electronic camera 10 and the identification information inputted by the user, and if both pieces of identification information coincide with each other as a result of collation, selects the electronic camera 10 that has transmitted the identification information coinciding with the inputted identification information to execute transmission and reception of information thereafter. However, the objects of the present invention are also attained by performing collation based on identification information obtained as described below.

The storefront vending machine 90 generates identification information such as a random number or an ID code peculiar to a device to display it on the displaying device 102, and the user inputs the identification information displayed on the displaying device 102 via the inputting device 68 of the electronic camera 10. The identification information inputted by the user is transmitted from the electronic camera 10 to the storefront vending machine 90. The storefront vending machine 90 collates the identification information received from the electronic camera 10 and the identification information generated and displayed in the storefront vending machine 90 and, if both pieces of the identification information coincide with each other as a result of the collation, selects a communication device which has transmitted the coinciding identification information to execute transmission and reception of information thereafter.

After the pairing, the user selects an image to be printed to transmit it to the storefront vending machine 90. The storefront vending machine 90 displays the received image on the displaying device 102 and executes print processing in accordance with size information of a print, number of prints information, print start information or the like instructed by the user.

Figure 13:
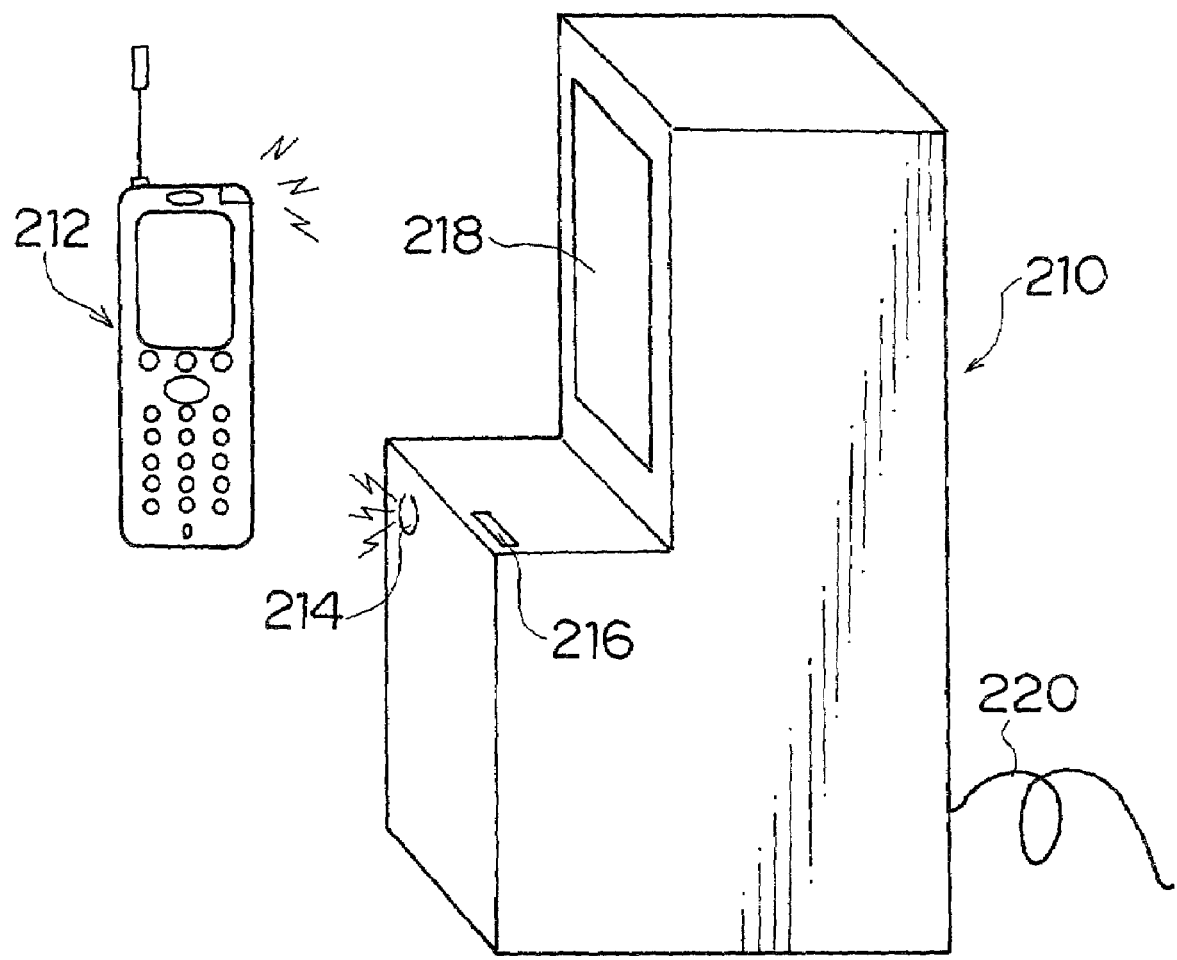
FIG. 13 is an external view of an installed terminal in accordance with the present invention.

FIG. 13 shows an external view of a communication terminal apparatus in accordance with the present invention.

According to the drawing, an installed terminal 210 (communication terminal apparatus) for relaying information is provided with an antenna 214 that is capable of wirelessly communicating with a portable terminal 212, a coin inserting opening 216 for inserting a use fee in utilizing a charged function of the installed terminal 210, a touch panel 218 having a function of a displaying device which notifies a user of a communication status, an image and information of the portable terminal 212 or the like connected by communication and a function of an inputting device for a user to input information, and a communication line capable of transmitting and receiving information on completion of transmission of image information and an image file, or the like to the other communication devices.

Figure 14:
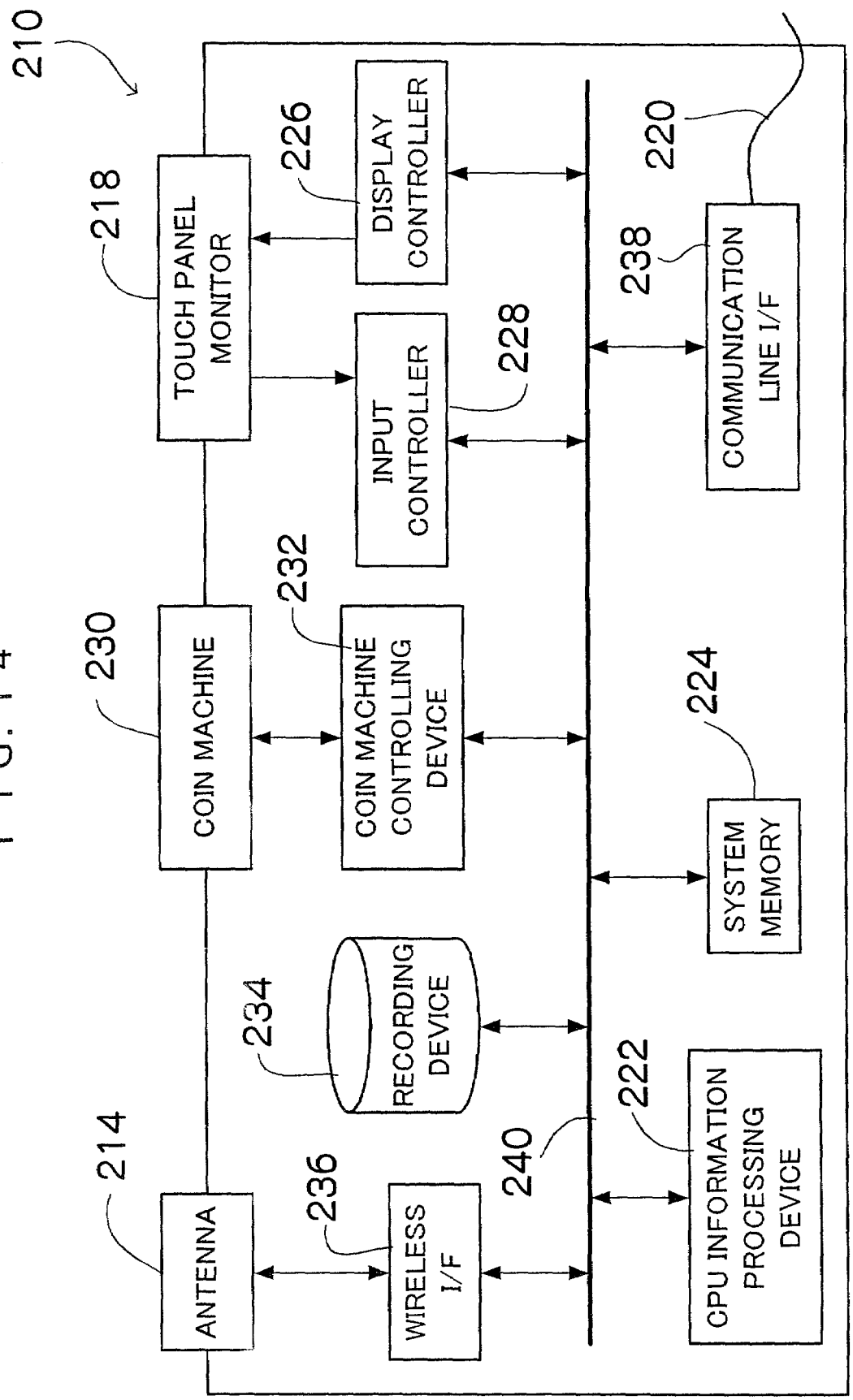
FIG. 14 is a block diagram of an information processing system of the installed terminal.

FIG. 14 shows a block diagram of an information processing system of the installed terminal 210.

According to the drawing, the installed terminal 210 is provided with an information processing device 222 for performing control of the entire installed terminal 210, a system memory 224 composed of a ROM in which a program for operating the information processing device 222, various constants or the like are written and a RAM to be a work area when the information processing device 222 executes processing, a display controller 226 for receiving information to be displayed on the touch panel 218 from the information processing device 222 to convert the information to information for display and output it, and an input controller 228 for converting information inputted by a user using the touch panel 218 to communicate it to the information processing device 222.

In addition, the installed terminal 210 is provided with a coin machine 230 which is provided with a coin inserting opening and controls processing of inserted coins and discharge of changes, a coin machine controlling device 232 for communicating information on an inserted amount to the information processing device 222 and at the same time receiving information on changes from the information processing device 222 to output the information to the coin machine 230, and a recording device 234 capable of temporarily stores information on an image received from the portable terminal 212, information on completion of transmission of an image file or the like.

As a third communicating device (a form of an information obtaining device) for performing transmission and reception of information with the second communication device on a user side, a wireless interface 236 is provided which outputs a carrier wave and a transmission signal to the antenna 214 for performing transmission and reception of information to and from the portable terminal 212 carried by a user and at the same time communicates information received by the antenna 214 from the portable terminal 212 to the information processing device 222.

In addition, the installed terminal 210 may use a wire communicating device in stead of using the third wireless communicating device as the information obtaining device which obtains information owned by the user side. Alternatively, a recording medium such as a floppy disk, a memory card or the like in which information owned by the user is recorded may be inserted in the installed terminal 210 to allow the information processing device 222 functioning as the information obtaining device to obtain information from the recording medium.

In addition, as a first communicating device with which the installed terminal 210 transmits and receives information to and from a communication device desired by a user to be a transmission destination of information and a second communicating device with which the installed terminal 210 transmits and receives information to and from the first communication device on the user side, a communication line interface 238 for transmitting and receiving information via the communication line 220 connected with a communication network such as a public line and the Internet is provided. Further, the first communicating device, the second communicating device and the third communicating device may be a communicating device independent from each other or at least two of them may be an identical communicating device.

The information processing device 222 of the installed terminal 210 and each peripheral circuit including the system memory 224, the display controller 226, the input controller 228, the coin machine controlling device 232, the recording device 234, the wireless interface 236 and the communication line interface 238 are connected by a bus 240, and the information processing device 222 is capable of controlling respective peripheral circuits.

FIG. 15 is an external view of a cellular phone that is a form of the communication device on a user side.

As shown in the figure, the portable terminal 212 (first and second communication devices on the user side) is composed of an antenna 242 for wirelessly communicating with a public network, an antenna 244 for wirelessly communicating at short-distance with, for example, the installed terminal 210, a displaying device 246 for displaying communication information and an image 245, inputting devices 248, 248 . . . for designating and selecting data of a telephone number, characters, an image and voices and designating a device, and an address or the like of a device in an output destination of the data, a speaker 250 which is used as a telephone receiver and outputs a sound, and a microphone 252 for inputting voices.

Further, an indication of the displaying device 246 shown in the figure shows an example of an indication when the image 245 is selected and the selected image 245 is transmitted to a communication device such as another cellular phone via the installed terminal 210.

FIG. 16 is a block diagram of an information processing unit of the portable terminal 212.

According to the drawing, a communicating device of the portable terminal 212 is composed of an antenna 242 for a public line for wirelessly communicating with the public line, a transmitting and receiving device 256 for the public line, an antenna 244 for executing wireless communication at a short distance with the installed terminal 210 or the like, a transmitting and receiving device 258 for a short distance, and transmission and reception buffers 260 and 262 for each communicating device which temporarily stores data to be transmitted and received on a real time basis.

In addition, the portable terminal 212 is provided with an information processing device 264 (CPU) for managing control of the entire portable terminal 212, a memory 266 that is a storing device to be a work area when the information processing device 264 executes processing, a nonvolatile memory 268 in which a program for operating the information processing device 264, various constants, telephone numbers, mail address of communication destinations, image data and the like are written, a calendar clock 270 for counting time, an I/O 272 for communicating various kinds of input information inputted from the inputting device 248 to the information processing device 264, and an LCD controlling device 274 for converting the display information received from the information processing device 264 to display information with respect to the displaying device 246.

The information processing device 264 of the portable terminal 212 and each peripheral circuit including the memory 266, the nonvolatile memory 268, the calendar clock 270, the transmission and reception buffers 260 and 262, the I/O 272 and the LCD controlling device 274 are connected by a bus 276, and the information processing device 264 is capable of controlling respective peripheral circuits.

The communicating device for a short distance is a communicating device using an electric wave, an ultrasonic wave, or light such as an infrared ray. The communicating device may be based on a specification of a wireless LAN (Local Area Network) if an electric wave is used, or may be based on a specification of IrDA if an infrared ray is used. In addition, instead of providing the communicating device for a short distance, the installed terminal 210 may obtain information via a recording medium such as a memory card and a floppy disk.

Further, the portable terminal 212 may be a moving communication body such as the above-mentioned cellular phone and a PHS. Alternatively, the portable terminal 212 may be a communication device such as an electronic camera, a personal computer and an electronic notebook as long as it is a device provided with a displaying device, a recording device, a communicating device or the like.

Figure 17:
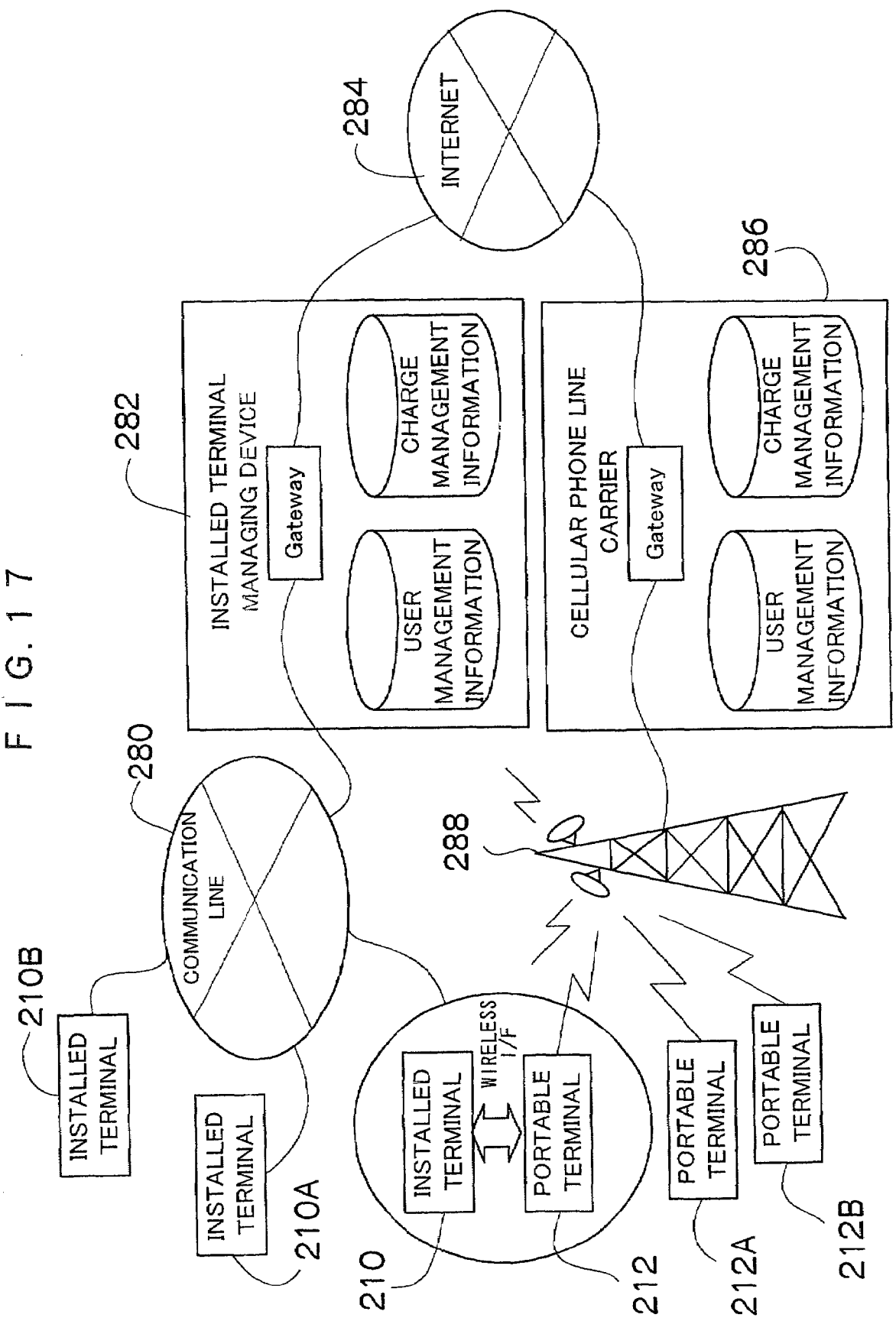
FIG. 17 is a schematic view showing a configuration of each communication network including installed terminals and portable terminals.

FIG. 17 shows a configuration of each communication network including the installed terminal 210 for relaying information and the portable terminal 212.

According to the drawing, the communication network is composed of a communication line 280 in which a plurality of installed terminals 210, 210A, 210B, . . . for relaying information are connected, an installed terminal managing device 282 provided with a device which records information such as management information and charge information of a user in order to manage the plurality of installed terminals 210, 210A, 210B, . . . and the portable terminal 212 at the same time performing communication with a communication network such as the Internet 284, a communication network such as the Internet 284, a cellular phone line carrier 286 provided with a device which records information such as management information and charge information of a user of each portable terminal in order to manage the plurality of portable terminals 212, 212A, 212B, . . . (the first and the second communication devices on the user side) and at the same time performing communication with a communication line such as the Internet 284, and a base station 288 of wireless communication for the portable terminals 212, 212A, 212B, . . . .

The installed terminal 210 and the portable terminal 212 transmit and receive information by wireless communication, and the installed terminals 210, 210A, 210B, . . . installed in various locations are connected to the Internet 284 via gateways provided in the communication line 280 and the installed terminal managing device 282.

On the other hand, each of the portable terminals 212, 212A, 212B, . . . is also connectable to a cellular phone line, which is also connected to the Internet 284 through a carrier of the cellular phone line. Therefore, electronic mails transmitted by the installed terminals 210, 210A, 210B, . . . are sent through the installed terminal managing device 282, the Internet 284 and the carrier of the cellular phone line, thereby being able to be transmitted to a specific portable terminal.

Figure 18:
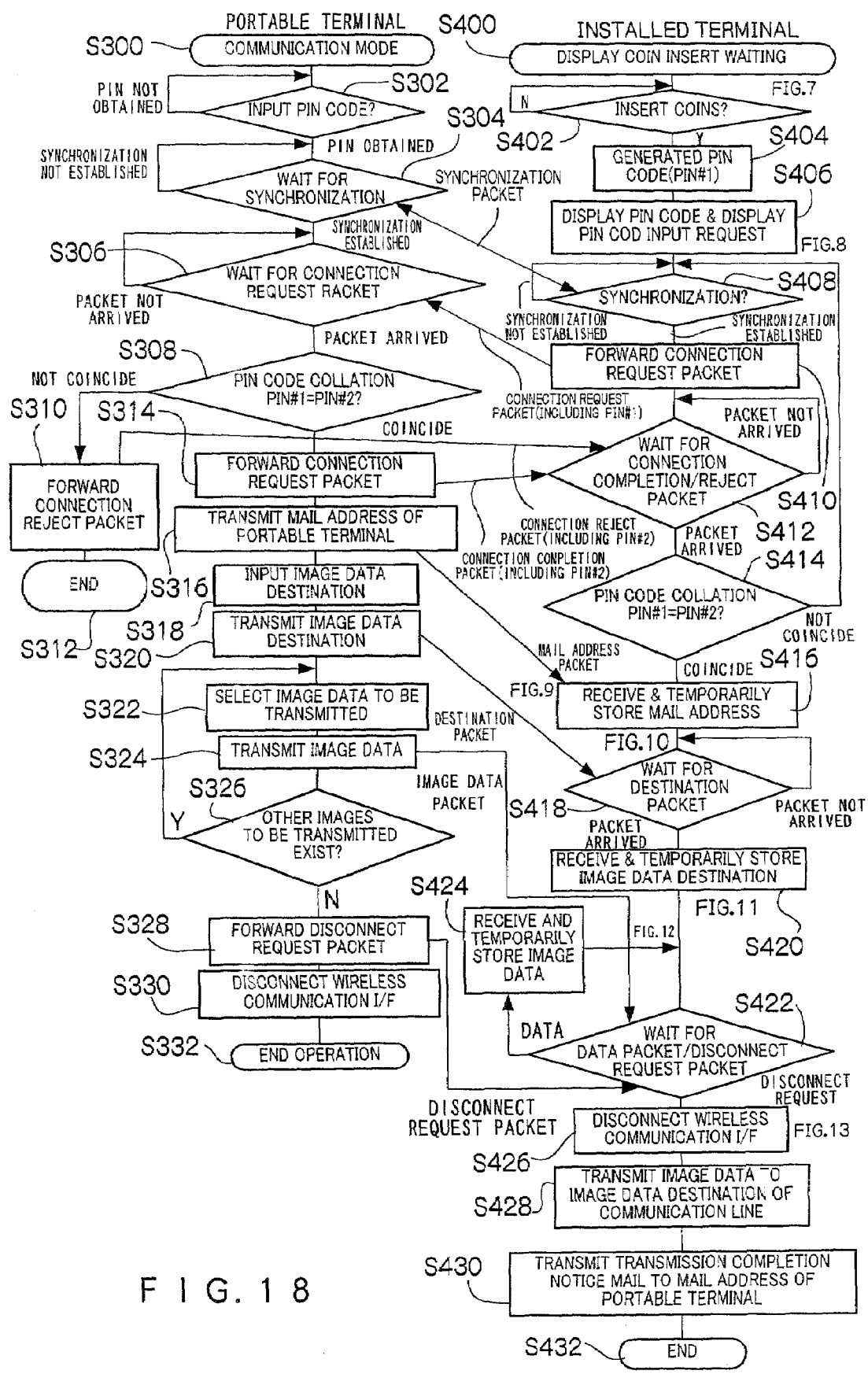
FIG. 18 is a flow chart showing communication to be executed by the installed terminal and the portable terminal.

FIG. 18 shows a flow chart of communication processing that is executed by the installed terminal 210 and the portable terminal 212.

When the setting mode of the portable terminal 212 is set in a mode of close distance communication, a processing routine of step S300 "communication mode" is called in a processing program of the information processing device 222 of the portable terminal 212, and the processing program advances to determination of the next S302 "input a PIN code?". In this embodiment, since the installed terminal 210 is capable of wirelessly communicating with the plurality of portable terminals 212, the installed terminal 210 is required to specify the portable terminal 212 carried by a user. Therefore, the installed terminal 210 generates a PIN code (Personal Identification Number) peculiar to it which is read by the user, the user inputs the PIN code in the portable terminal 212, and the installed terminal 212 receives the inputted PIN code and compares it with the PIN code generated by itself to specify the portable terminal 212 of the user.

On the other hand, an initial state in the installed terminal 210 S400 "display coin insertion waiting". The installed terminal 210 displays an indication for the coin insert request shown in FIG. 19 on the touch panel 218 and at the same time performs processing for waiting for the user inserting coins in the next S402 "insert coins?". Here, when coins are inserted, the installed terminal 210 generates a PIN code for executing pairing to be described below in the next S404 "generate a PIN code (PIN#1)" and the processing program advances to the next S406 "display a PIN code and display a PIN code input request".

In step S406, the installed terminal 210 makes an indication for inputting a PIN code shown in FIG. 20 on the touch panel 218 and the processing program advances to the next S408 "synchronization?" and waits for completion of processing with which a slaving communication device synchronizes with, for example, a frequency hopping pattern and a time slot in a close distance wireless communication.

On the other hand, the portable terminal 212 is waiting for input of a PIN code by a user in S302. When the user operates the inputting device 248, 248, . . . of the portable terminal 212 to input the PIN code "193-513" shown in FIG. 20, the portable terminal 212 stores the inputted PIN code as "PIN#2" and the processing program advances to determination of the next S304 "wait for synchronization". Then, in S304, when timing of transmission and reception coincides with a signal emitted from the installed terminal 210 that is a master communication device and the synchronization processing ends, the processing program of the portable terminal 212 advances to the next S306 "wait for a connection request packet".

When the synchronization processing ends, the processing program of the installed terminal 210 advances to S410 "forward a connection request packet", where the installed terminal 210 transmits a connection request signal including the generated PIN code #1 and the processing program advances to processing of the next S412 "complete connection/wait for a rejection packet". The processing program of the portable terminal 212 having received the connection request signal including the PIN code #1 in S306 advances to determination of the next S308 "PIN code collation PIN#1=PIN#2?".

Here, the portable terminal 212 determines whether or not the PIN code #1 received from the installed terminal 210 and the PIN code #2 inputted in the portable terminal 212 coincide with each other. If it is determined that both the PIN codes do not coincide with each other, the portable terminal is determined not to be the portable terminal 212 of an actual user who paid a use fee to the installed terminal 210, and the processing program advances to S310 "forward a connection reject packet", where the portable terminal 212 transmits connection reject information including the inputted PIN code #2 to the installed terminal 210, and the processing program advances to S312 "end".

If it is determined that the PIN code #2 inputted in S302 and the PIN code #1 received from the installed terminal 210 coincide with each other, the portable terminal 212 is determined to be the portable terminal 212 of the actual user who paid a use fee to the installed terminal 210, the processing program advances to S314 "forward a connection request packet", where the portable terminal 212 transmits a connection completion packet including the inputted PIN code #2 to the installed terminal 210, and the processing program advances to the next S316 "transmit a mail address of a portable terminal".

On the other hand, when the installed terminal 210 receives the connection reject packet or the connection completion packet from the portable terminal 212 in S412, the processing program advances to determination of the next S324 "PIN code collation PIN#1=PIN#2?".

Here, the installed terminal 210 determines whether or not the PIN code #2 received from the portable terminal 212 and the PIN code #1 generated in the installed terminal 210 coincide with each other. If it is determined that both the PIN codes do not coincide with each other, the processing program returns to the processing of S408, where the installed terminal 210 performs processing for waiting for synchronization again.

In addition, if it is determined that the PIN code #2 received from the portable terminal 212 and the PIN code #1 generated in the installed terminal 210 coincide with each other, the processing program makes an indication of connection completion shown in FIG. 21 and at the same time ends the pairing processing, and the processing program advances to the next S416 "receive a mail address and save it temporarily". In step S416, the installed terminal 210 receives the mail address of the portable terminal 212 (equivalent to address information such as a telephone number in transmitting result information on transmitted information such as image data to the first communication device on the user side) and stores it in, for example, the recording device 234 of the installed terminal 210 temporarily. Then, the processing program advances to determination of waiting for receiving a transmission destination address of the next S418 "wait for a destination packet", and the installed terminal 210 urges the user to input an address of a destination of image d ata shown in FIG. 22 on the touch panel 218.

Next, when the user inputs an input destination of image data via the inputting device 248, 248, . . . of the portable terminal 212 in S318 "input a destination of image data", the portable terminal 210 transmits address information of a destination of the image data to the installed terminal 210 in the next S320 "transmit a destination of image data", and the processing program advances to the next S322 "select image data to be transmitted". Further, instead of inputting a destination of information in the portable terminal 212, the user may input a transmission destination of information using the inputting device provided in the touch panel 218 of the installed terminal 210.

On the other hand, the processing program of the installed terminal 210 having received the "destination packet" indicating a transmission destination of information in S418 advances to the next S420 "receive a destination of image data and store it temporarily", where the installed terminal 210 temporarily records information indicating a transmission destination of the information received from the portable terminal 212 in, for example, the recording device 234 of the installed terminal 210. Then, the processing program advances to determination of the next S422 "wait for a data packet/disconnection request packet", where the installed terminal 210 urges the user to input a request for selecting information such as image data to be transmitted as shown in FIG. 23 in the touch panel 218. Further, a "cancellation" button shown in FIG. 23 is an indication to be displayed when a charge is set to be paid later. When "cancellation" is selected, transmission of information is stopped. In addition, processing may be selected such as validating "cancellation" if it is within thirty minutes from an application. If the portable terminal 212 is a cellular phone, a method of notifying an ID number and charge information of a cellular phone from the installed terminal managing device 282 to the cellular phone line carrier 286 to add a use fee of an image transmission service to a telephone use fee of the cellular phone is possible as a method of charging a use fee of the image transmission service to a user for deferred payment. If this method is employed, even if image data was not transmitted from the installed terminal 210 to a destination desired by a user, cancellation of a charge can be easily executed by transmitting an electronic mail indicating cancellation of the charge from the installed terminal managing device 282 to the cellular phone line carrier 286.

In S322 of the processing program of the portable terminal 212, an indication shown in the above-mentioned FIG. 15 is made on the displaying device 246 of the portable terminal 212, and it is possible for a user to easily select an image to be transmitted out of a plurality of images recorded in the non-volatile memory 268 of the portable terminal 212. When an image to be transmitted is decided in S322, the processing program advances to the next S324 "transmit image data".

In the next S324, the portable terminal 212 performs processing for transmitting the image data selected in S322 to the installed terminal 210. When the transmission of the image data ends, the processing program advances to determination of the next S326 "other images to be transmitted exist?", where the portable terminal 212 determines whether or not other images to be transmitted exist. If it is determined that there are other images to be transmitted by the user, the processing program returns to S322, where the portable terminal 212 selects an image to be transmitted again. In addition, if it is determined that there is not image to be transmitted, the processing program advances to S328 "forward a disconnection request packet", where the portable terminal 212 transmits a packet of a disconnection request to the installed terminal 210.

When the transmission of the disconnection request packet is completed in S328, the processing program of the portable terminal 212 advances to S330 "disconnect wireless communication I/F", where the portable terminal 212 ends various kinds of processing for close distance wireless communication, and the processing program advances to the next S332 "end operation", where the portable terminal 212 ends the processing routine of the close distance wireless communication.

Further, in S422 of the processing program of the installed terminal 210, processing for waiting for receipt of a "data packet" or a "disconnection request packet" from the portable terminal 212. If the installed terminal 210 receives a "data packet" from the portable terminal 212, the processing program advances to S424 "receive image data and store it temporarily", where the installed terminal 210 makes an indication shown in FIG. 24 on the touch panel 218 and at the same time received information such as image data from the portable terminal 212 to temporarily store the information in, for example, the recording device 234 of the installed terminal 210. Then, the processing program returns to S422 again. Further, as shown in FIG. 13, a unique "use number" may be displayed for each order to notify a user of the use number associated with the order.

If the installed terminal 210 receives a "disconnection request packet" from the portable terminal 212, the processing program advances to the next S426 "disconnect wireless communication I/F", where the installed terminal ends various kinds of processing relating to close distance wireless communication and displays the indication shown in FIG. 13 on the touch panel 218 for a predetermined period of time. Then, the processing program advances to the next S428 "transmit image data to a destination of image data of a communication line". Further, when a predetermined time has passed since the indication shown in FIG. 13 is made, the indication on the touch panel 218 is switched to the indication shown in FIG. 19. Processing to be executed by the user and the portable terminal 212 with respect to the installed terminal 210 has been executed up to this point, and processing shifts to that after the installed terminal 210.

In S428, the installed terminal 210 performs processing for transmitting image data received from the portable terminal 212 and temporarily recorded in the recording device 234 of the installed terminal 210 in S424 and address information of a transmission destination of the image data to the installed terminal managing device 282 via the communication line 220. This transmission processing may be executed simultaneously with the start of receiving processing of image data in S424. Then, when transmission of all pieces of data to be transmitted ends, the processing program advances to the next S430 "transmit a mail notifying completion of transmission to a mail address of a portable terminal". Further, if this transmission processing is not of specific urgency for the user, it may be executed during a time band when a use fee of a public line is inexpensive (during nighttime).

In S430, the installed terminal 210 transmits a notice of completion of transmission indicating that transmission of image data requested to be transmitted has been completed to the mail address of the portable terminal 212 via the communication line 220 in a form of an electronic mail. The electronic mail of the notice of completion of transmission is recorded in a recording device such as a server as user management information of the cellular phone carrier 286 via the installed terminal managing device 282 and the Internet 284.

When the power source of the portable terminal 212 is applied or a state of wireless communication is fine, the electronic mail of the notice of completion of transmission recorded in the cellular phone line carrier 286 is transmitted to the portable terminal 212 via the base station 288. The user can inspect the received electronic mail of the notice of completion of transmission and learn that the transmission of the ordered image data has ended without a problem. In addition, instead of transmitting the electronic mail of the notice of completion of transmission, the completion of transmission may be notified verbally.

In addition, the second communication device on the user side that is the origin of transmission of image data and the first communication device which is the notification destination to be notified of a result of transmitting the image data may be communication devices different from each other or may be an identical communication device (the portable terminal 212, etc.). In addition, Address information such as a telephone number of a notification destination to be notified of the transmission result of the image data (the first communication device on the user side) may be automatically obtained by the information processing device 222 from the second communication device on the user side as described above or may be obtained from an inserted recording medium if the information is obtained via a recording medium.

In addition, if image data cannot be transmitted to a transmission destination desired by a user by any chance, an electronic mail including information relating to a failure of transmission of the image data is transmitted to the portable terminal 212 to notify the user of the failure. Further, in that case, an electronic mail such as "An image you ordered has not been transmitted. It is possible to perform transmission of the image data again with the same reception number free of charge." may be transmitted to the portable terminal 212 of the users.

In addition, information to be transmitted from the portable terminal 212 to another communication device is not limited the above-described image data but may be data such as character information. In addition, the installed terminal 210 is not limited to those described above, and the objects of the present invention can be attained by a communication terminal apparatus in a form such as a public phone or a storefront vending machine.

As described above, according to the communication device in accordance with the present invention, since the communication device is provided with the communicating device which is capable of transmitting and receiving information wirelessly to and from a plurality of other communication devices and receives identification information peculiar to a device from the other communication devices; the inputting device which a user uses to input the identification information peculiar to a device; and the collating device which collates the received identification information peculiar to a device with the inputted identification information peculiar to a device, and, if both pieces of identification information coincide with each other as a result of the collation, the communication device selects a communication device which has transmitted the identification information coinciding with the inputted identification information to transmit information to the communication device thereafter, devices of users wishing to communicate with each other can be easily specified when a plurality of communication devices are connected wirelessly to transmit and receive information.

In addition, according to another form of the present invention, since the communication device is provided with the displaying device which generates identification information peculiar to a device to display it to a user; the communicating device which is capable of transmitting and receiving information wirelessly to and from a plurality of other communication devices and at the same time receives identification information peculiar to a device inputted in another communication device by the user from the another communication device; and the collating device which collates the received identification information peculiar to a device with the generated identification information peculiar to a device, and, if both pieces of identification information coincide with each other as a result of the collation, the communication device selects a communication device which has transmitted the identification information coinciding with the inputted identification information to transmit information to the communication device thereafter, devices of users wishing to communicate with each other can be easily specified when a plurality of communication devices are connected wirelessly to transmit and receive information.

In addition, according to the communication system in accordance with the present invention, since the communication device is provided with the first communication device provided with the first communicating device which is capable of transmitting and receiving information wirelessly to and from other communication devices and at the same time generates and transmits identification information peculiar to a device; the second communicating device which is capable of transmitting and receiving information wirelessly to and from another communication apparatus including the first communication device and receives identification information peculiar to a device from other communication devices; the inputting device with which a user inputs identification information peculiar to a device; the collating device which collates the received identification information peculiar to a device with the inputted identification information peculiar to a device; and the second communication device which, if both pieces of identification information coincide with each other as a result of the collation, selects a communication device which has transmitted identification information coinciding with the inputted identification information to perform transmission and reception of information thereafter, devices of users wishing to communicate with each other can be easily specified when a plurality of communication devices are connected wirelessly to transmit and receive information.

In addition, according to another form of the present invention, since the communication device is provided with the displaying device which generates identification information peculiar to a device to display it to a user; the first communication device which is capable of transmitting and receiving information wirelessly to and from a plurality of other communication devices and at the same time receives identification information peculiar to a device inputted by the user from another communication device; the collating device which collates the generated identification information peculiar to a device with the identification information peculiar to a device received via the first communicating device; the first communication device which, if both pieces of identification information coincide with each other as a result of the collation, selects a communication device which has transmitted identification information coinciding with the generated identification information to perform transmission and reception of information thereafter; the inputting device which a user uses to input the identification information peculiar to a device; and the second communication device which is capable of transmitting and receiving information wirelessly to and from other communication devices and at the same time transmits identification information peculiar to a device inputted by the user to the first communication device, devices of users wishing to communicate with each other can be easily specified when a plurality of communication devices are connected wirelessly to transmit and receive information.

In addition, according to the communication terminal apparatus in accordance with the present invention, since the communication device is provided with the information obtaining device which obtains information owned by a user; the recording device which records the information obtained by the information obtaining device; the first communicating device which reads out the information recorded by the recording device to transmit the information to a destination desired by the user; and the second communicating device which transmits information on a result of the first communicating device transmitting the information to a first communication device on the user side, it becomes possible to notify a user whether or not information that should be transmitted has been surely transmitted.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A service communication device, comprising:
a communicating section which is capable of transmitting and receiving information wirelessly to and from a plurality of soliciting communication devices concurrently and wirelessly receives from the plurality of soliciting devices identification information peculiar to the devices;
an inputting section included in the communication device which a user uses to manually input an identification information peculiar to a particular soliciting device; and
a collating section which, at the time of manual input of the identification information, collates the wirelessly received identification information peculiar to the plurality of soliciting devices with the inputted identification information peculiar to the particular soliciting device,
wherein, if both pieces of identification information coincide with each other as a result of the collation, the communication section selects the soliciting communication device which has wirelessly transmitted the identification information coinciding with the inputted identification information to transmit information to thereafter, wherein communication pairing is established between the service communication device and the particular soliciting communication device.

2. The service communication device according to claim 1, wherein, if both pieces of identification information coincide with each other as a result of the collation, the communication section utilizes contents of the identification information to carry out services.

3. The service communication device according to claim 1, wherein the identification information is identification information including a random number or a serial number peculiar to the soliciting communication device.

4. The communication device according to claim 1, wherein the plurality of soliciting communication devices are photographing devices.

5. The service communication device according to claim 1, wherein the communication pairing is established only if the particular soliciting device determines that the identification information issued by the particular soliciting device coincides with the identification information inputted into the communication device.

6. A service communication device, comprising:
a displaying section which generates identification information peculiar to participating soliciting communication devices and displays it to a user;
a communicating section which is capable of transmitting and receiving information wirelessly to and from a plurality of soliciting communication devices concurrently and at the same time wirelessly receives from at least one of the soliciting communication devices identification information peculiar to that device which has been manually inputted into the soliciting communication device by the user, whereby the manually inputted identification information is identical to the information generated and displayed by the displaying section; and
a collating section which, at the time of manual input of the identification information, collates the wirelessly received identification information peculiar to the soliciting device with the generated identification information peculiar to the participating soliciting devices,
wherein, if both pieces of identification information coincide with each other as a result of the collation, the communication section selects the soliciting communication device which has transmitted the identification information coinciding with the generated identification information to transmit information to thereafter
wherein communication pairing is established between the service communication device and the selected soliciting communication device.

7. The service communication device according to claim 6, wherein, if both pieces of identification information coincide with each other as a result of the collation, the communication section utilizes contents of the identification information to carry out services.

8. The service communication device according to claim 6, wherein the identification information is identification information including a random number or a serial number peculiar to the soliciting communication device.

9. The communication device according to claim 6, wherein the plurality of soliciting communication devices are photographing devices.

10. A communication system, comprising:
a soliciting communication device provided with a communicating section which is capable of transmitting and receiving information wirelessly to and from other communication devices and at the same time generates and transmits identification information peculiar to the soliciting device;
a service communicating device which is capable of transmitting and receiving information wirelessly to and from still other communication devices including the soliciting communication device and wirelessly receives identification information peculiar to the device from at least the soliciting communication device;
an inputting device included in the service communication device with which a user manually inputs identification information peculiar to a participating soliciting device; and
a collating device which, at the time of manual input of the identification information, collates the wirelessly received identification information peculiar to the soliciting device with the manually inputted identification information peculiar to the participating soliciting device,
wherein the service communication device, if both pieces of identification information coincide with each other as a result of the collation, selects a soliciting communication device which has transmitted identification information coinciding with the inputted identification information to perform transmission and reception of information thereafter,
wherein communication pairing is established between the second service communication device and the particular soliciting communication device.

11. The communication system according to claim 10, wherein the service communication device is provided with a displaying device which displays identification information peculiar to the soliciting communication device to a user.

12. The communication system according to claim 10, wherein, if both pieces of identification information coincide with each other as a result of the collation, the communication system utilizes contents of the identification information to carry out services.

13. The communication device according to claim 10, wherein the soliciting communication device is a photographing device.

14. A communication system, comprising:
a displaying device which generates identification information peculiar to a participating soliciting device to display it to a user;
a service communication device which is capable of transmitting and receiving information wirelessly to and from a plurality of soliciting communication devices concurrently and at the same time wirelessly receives identification information peculiar to the soliciting device, the generated identification information being inputted by the user into the participating soliciting communication device;
a collating device which, at the time of manual input of the identification information, collates the generated identification information peculiar to the soliciting device with the identification information peculiar to the device received wirelessly from the soliciting communicating device, wherein
the service communication device, if both pieces of identification information coincide with each other as a result of the collation, selects a soliciting communication device which has transmitted identification information coinciding with the generated identification information to perform transmission and reception of information thereafter; and wherein communication pairing is established between the service communication device and the soliciting communication device.

15. The communication system according to claim 14,
wherein, if both pieces of identification information coincide with each other as a result of the collation, the communication system utilizes contents of the identification information to carry out services.

16. The communication device according to claim 14, wherein the second communication device is a photographing device.

17. A communication method for, after pairing is established between any one of a plurality of soliciting communication devices of a user and a service communication device, wirelessly transmitting and receiving between the soliciting communication device and the service communication device for which the pairing is established, comprising:

wirelessly transmitting identification information peculiar to a device from the soliciting communication device;

enabling manual input to receive the identification information via a inputting device of the service communication device; and collating, at the time of manual input of the identification information, the identification information peculiar to the device wirelessly received and identification information peculiar to the device manually inputted by the inputting device and, if both pieces of identification information coincide with each other, establishing pairing with the soliciting communication device which transmits the identification information.

18. The communication method according to claim 17,
wherein if both pieces of identification information coincide with each other as a result of the collation, the communication method utilizes contents of the identification information to carry out services.

19. The communication device according to claim 17, wherein the communication device is a photographing device.

20. A communication method for, after pairing is established between any one of a plurality of soliciting communication devices of a user and a service communication device, wirelessly transmitting and receiving between the soliciting communication device and the service communication device for which the pairing is established, comprising:

generating identification information in the service communication device peculiar to a participating soliciting communication device;

enabling manual input to receive the identification information generated by the service communication device into the participating soliciting communication device by using an inputting device in the participating soliciting communication device;

wirelessly transmitting the inputted identification information from the soliciting communication device to the service communication device; and collating, at the time of manual input of the identification information, the identification information wirelessly received from the soliciting communication device and the identification information generated by the service communication device and, if both pieces of identification information coincide with each other, establishing pairing with the soliciting communication device which transmits the identification information.

21. The communication method according to claim 20,
wherein if both pieces of identification information coincide with each other as a result of the collation, the communication method utilizes contents of the identification information to carry out services.

22. The communication device according to claim 20, wherein the first communication device is a photographing device.

23. A communication device, comprising:

an information obtaining device which establishes a wireless communication pairing with any one of plurality of soliciting communication devices of a user and wirelessly receives information from the paired soliciting communication device;

a code generating device which generates a code peculiar to each wireless communication pairing before every wireless communication pairing is established;

a display device which displays the code generated by the code generating device;

a recording device which records the information obtained by the information obtaining device;

a first communicating device which reads the information recorded by the recording device to wirelessly transmit the information to a destination desired by the user;

a second communicating device which transmits information on a result of the first communicating device wirelessly transmitting the information to the destination desired by the user; and wherein the information obtaining device establishes the wireless communication pairing if the code generated by the code generating device coincides with a code which derives from user's manual input on the one of plurality of soliciting communication devices and which is sent from the one of plurality of soliciting communication devices.

* * * * *